(12) United States Patent
Rajendran

(10) Patent No.: US 12,526,703 B2
(45) Date of Patent: Jan. 13, 2026

(54) SLEEPING CELL DETECTION IN AN OPEN RADIO ACCESS NETWORK

(71) Applicant: DISH Wireless L.L.C., Englewood, CO (US)

(72) Inventor: Karupaiah Rajendran, Sachse, TX (US)

(73) Assignee: DISH WIRELESS L.L.C., Englewood, CO (US)

( * ) Notice: Subject to any disclaimer, the term of this patent is extended or adjusted under 35 U.S.C. 154(b) by 399 days.

(21) Appl. No.: 18/174,526

(22) Filed: Feb. 24, 2023

(65) Prior Publication Data

US 2024/0292284 A1  Aug. 29, 2024

(51) Int. Cl.
*H04W 36/00* (2009.01)

(52) U.S. Cl.
CPC ............... *H04W 36/0058* (2018.08); *H04W 36/008375* (2023.05)

(58) Field of Classification Search
CPC ............. H04W 36/00; H04W 36/0058; H04W 36/00837
See application file for complete search history.

(56) References Cited

U.S. PATENT DOCUMENTS

| | | | |
|---|---|---|---|
| 2015/0098392 A1 | 4/2015 | Homchaudhuri et al. | |
| 2017/0331565 A1 | 11/2017 | Westerberg et al. | |
| 2021/0368405 A1* | 11/2021 | Mishra | H04W 36/0058 |
| 2022/0377577 A1 | 11/2022 | Radunovic et al. | |
| 2022/0400423 A1* | 12/2022 | Vivanco | H04W 36/0079 |
| 2023/0164597 A1 | 5/2023 | Kumar et al. | |
| 2023/0209433 A1 | 6/2023 | Tammana et al. | |
| 2024/0049024 A1 | 2/2024 | Harris et al. | |
| 2024/0292245 A1 | 8/2024 | Rajendran | |
| 2024/0292480 A1 | 8/2024 | Rajendran | |

OTHER PUBLICATIONS

Invitation to Pay Additional Fees for PCT Application No. PCT/US2024/017161, dated Jun. 18, 2024, 12 pages.
International Search Report and Written Opinion for PCT Application No. PCT/US2024/017161, dated Aug. 8, 2024, 21 pages.
National Instruments, "An Introduction to O-RAN," White paper, 2020, ni.com/5g-test-ue. (8 pages).
U.S. Appl. No. 18/174,530, filed Feb. 24, 2023.
U.S. Appl. No. 18/174,522, filed Feb. 24, 2023.

* cited by examiner

*Primary Examiner* — Jamal Javaid
(74) *Attorney, Agent, or Firm* — Seed Intellectual Property Law Group LLP

(57) ABSTRACT

A method and apparatus for cell sleep state detection and recovery are provided. In the method and apparatus, one or more connection state criteria indicative of whether a cell is in a sleep state are evaluated to determine whether the one or more connection state criteria are met. The one or more connection state criteria are selected from a random access channel (RACH) criterion, a channel measurement criterion, a cell handover criterion, a connection statistics criterion, a connected user equipment criterion, or a measurement change criterion. It is determined whether the cell is in the sleep state based on whether at least one of the one or more connection state criteria are met and in response to determining that the cell is in the sleep state, action is taken to cause the cell to exit the sleep state.

17 Claims, 11 Drawing Sheets

SLEEPING CELL DETECTION IN AN OPEN RADIO ACCESS NETWORK

BACKGROUND

In a radio access network, a cell may enter into a sleep state. Entry into the sleep state causes the cell to become unresponsive in the uplink thereby failing to receive uplink transmissions from the user equipment. A sleeping cell may not grant user equipment resources for transmitting uplink data. A cell may enter into the sleep state because software associated with the cell is a 'hang state' or 'frozen.' The physical hardware of the cell may be deemed healthy. However, a software malfunction may cause the cell to be in the sleep state. Additionally, a cell may be asleep due to a memory leak that results in failures in releasing memory resources when the resources are no longer in use.

In addition, the cell may be asleep due to an inability to optimally prioritize tasks. The cell may be asleep due to the fact that the cell is clogged or overburdened with requests for access. A sleeping cell negatively impacts and reduces radio coverage, and the sleeping cell may result in a 'coverage hole.' That is due to the fact that user equipment may resort to transitioning another cell or engaging in a handover to the other cell for coverage.

BRIEF SUMMARY

Disclosed herein are techniques for detecting a sleeping cell in a radio access network, such as an open radio access network (O-RAN). A sleeping cell includes those cells that from time to time are not responsive to uplink transmissions made by user equipment for any reason, whether being in low power mode, internal updating of software or other reasons. When a cell is asleep, namely, in a sleep state, it may not provide coverage to the user equipment and may result in gaps or coverage holes in the network.

Detection of the sleeping cell may be determined based on connection state criteria (e.g., of the user equipment). The connection state criteria may employ metrics or statistics, among others, associated with user equipment connectivity in the cell to determine whether the cell is in a sleep state. For example, the fact that the cell is asleep may be reflected in a failure (or relatively low rates of success associated with) random access channel (RACH) procedures performed by user equipment in the cell or a failure (or relatively low rates of success associated with) handover of user equipment from another cell to the sleeping cell. Techniques are described herein for evaluating one or more connection state criteria to determine whether the connection state criteria suggest the cell is in a sleep state. Upon detecting that the cell is in a sleep state, the cell may be recovered from the sleep state. The detection and recovery techniques described herein improve network coverage and mitigate coverage gaps that could result from cells being in a sleep state.

DETAILED DESCRIPTION

Figure 1:
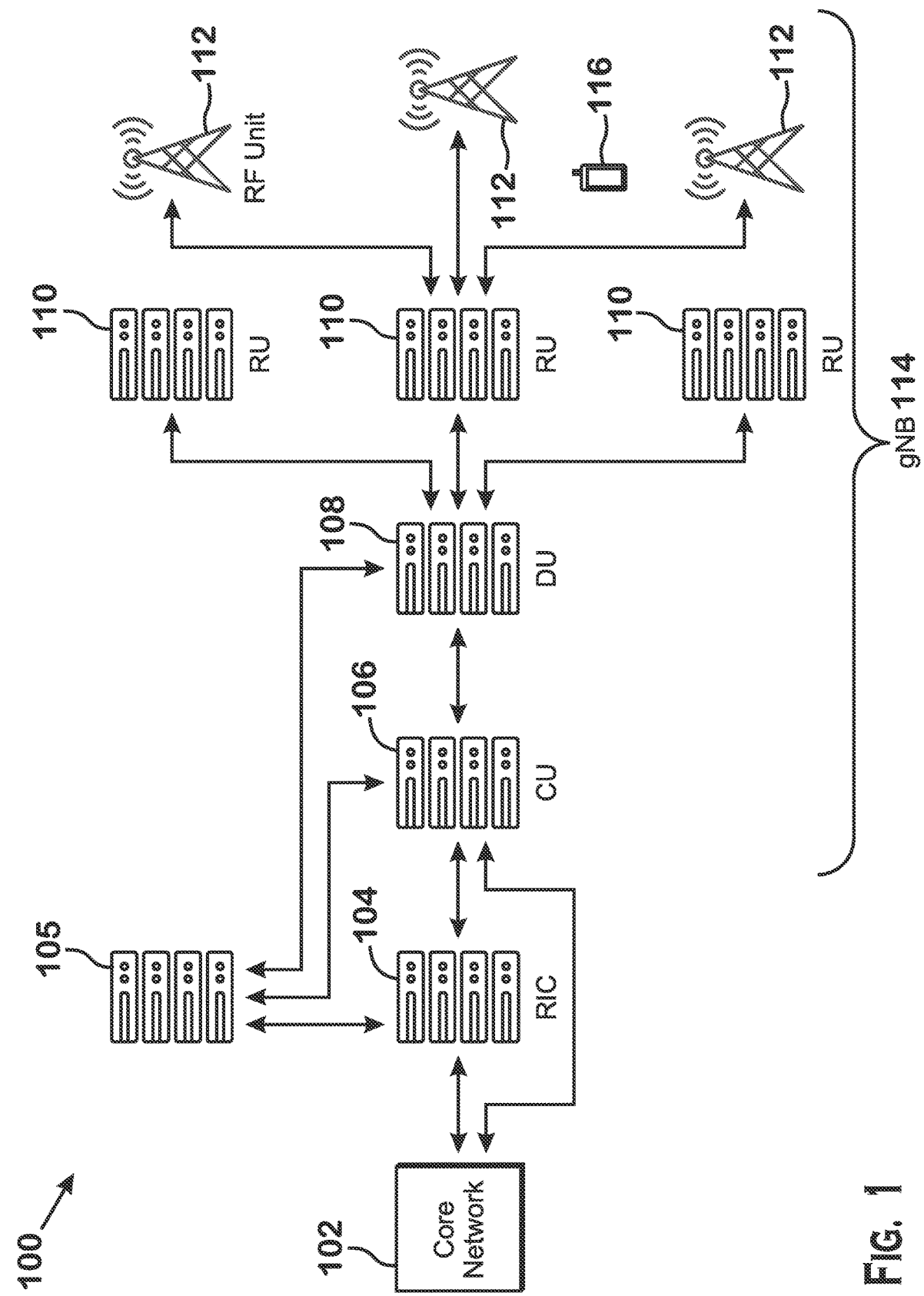
FIG. 1 shows an example of a wireless network system according to a next generation NodeB type.

FIG. 1 shows an example of a wireless network system 100. The wireless network system 100 may an open radio access network (O-RAN). The O-RAN wireless network system 100 includes a core network 102, a radio access network (RAN) intelligent controller (RIC) 104, an element management system (EMS) 105, a central unit 106, a distributed unit 108, a plurality of radio units 110 and a plurality of radio frequency (RF) units 112. The central unit 106, distributed unit 108, radio units 110 and RF units 112 collectively make up a next generation NodeB (gNB) 114. Also shown in FIG. 1 is a user equipment (UE) 116, which may communicate with the gNB 114 over the RF unit 112. Although one user equipment 116 is shown in FIG. 1, it is noted that the gNB 114 may serve multiple user equipment by sending downlink data to the user equipment and receiving uplink data from the user equipment.

An RF unit 112 may be a cellular tower. The RF unit 112 may include one or more antennas configured to wirelessly communicate with the user equipment 116. For example, the RF unit 112 may include one or more antenna arrays. Each array may include multiple antennas arranged linearly. Further, the array may be a planar array and may include multiple antennas arranged in two-dimensional (2D) space. The RF unit 112 may transmit radio waves (RF signals) to the user equipment 116 to send downlink data to the user equipment 116. The RF unit 112 may receive radio waves transmitted by the user equipment 116 and may, accordingly, receive uplink data from the user equipment 116.

The radio unit 110 may include a server, a baseband processor, a digital front-end and an analog front-end. The analog front-end may interface with the RF units 112. The analog front-end may receive intermediate frequency (IF) signal representative of the RF signals from the RF unit 112. The analog front-end may also send intermediate frequency signals to the RF unit 112 for transmission as RF signals. The baseband processor may process the intermediate frequency signals received from the RF unit 112 and generate digital baseband signals therefrom. The baseband processor may process the intermediate frequency received from the RF unit 112 and generate digital baseband signals therefrom, and the baseband processor may process digital baseband signals received from the distributed unit 108 and generate intermediate frequency signals therefrom.

The server or the baseband processor of the radio unit 110 may perform lower physical layer (PHY) processing on the digital signals received from the distributed unit 108. The processing may include applying a fast Fourier transform (FFT) to the digital signals, performing precoding on the digital signals, modulating the digital signals, performing beamforming on the digital signals or a combination thereof. The server or the baseband processor of the radio unit 110 may perform lower PHY processing on the intermediate frequency signals received from the RF unit 112. The processing may include applying an inverse fast Fourier transform (IFFT) to the intermediate frequency signals, performing precoding on the intermediate frequency signals, demodulating the intermediate frequency signals, performing beamforming processing on the intermediate frequency signals or a combination thereof.

A connection between the radio unit 110 and the distributed unit 108 is referred to as the fronthaul. The distributed unit 108 outputs the digital signals to the radio unit 110 over the fronthaul. The distributed unit 108 may include a server configured to perform higher PHY processing on the digital signals. The distributed unit 108 may perform resource element mapping, layer mapping scrambling, precoding, modulation, encoding or a combination thereof on the digital signals. The distributed unit 108 then outputs the digital signals having performed higher PHY processing on the digital signals.

A connection between the distributed unit 108 and the central unit 106 is referred to as the midhaul. The distributed unit 108 outputs the digital signals to the radio unit 110 over the fronthaul. The distributed unit 108 may include a server configured to perform higher PHY processing on the digital signals. The distributed unit 108 may perform resource element mapping, layer mapping scrambling, precoding, modulation, encoding or a combination thereof on the digital signals. The distributed unit 108 then outputs, to the radio unit 110, the digital signals having performed higher PHY processing on the digital signals.

The central unit 106 may include a server configured to control the operations of the distributed unit 108 over the midhaul. The central unit 106 performs Radio Resource Control (RRC) protocol connection establishment, connection release, broadcast of system information, radio bearer establishment, radio bearer reconfiguration, radio bearer release, connection mobility procedures, paging notification or a combination thereof.

In the gNB 114, the central unit 106 may serve and may be connected to multiple distributed units 108. Further, as shown in FIG. 1, each distributed unit 108 serves multiple radio units 110, whereby each radio units 110 serves multiple RF units 112. The central unit 106 and the distributed unit 108 may each be virtual servers that are hosted and virtualized using underlying computing resources (such as physical servers, routers and memory for data storage, among others). The underlying computing resources may be located in the same data center or different data centers.

The central unit 106 has a backhaul connection to the RAN intelligent controller 104. The RAN intelligent controller 104 may be a server configured to control and optimize the functions of the wireless system 100. The RAN intelligent controller 104 may perform load balancing to mitigate network congestion. The RAN intelligent controller 104 may also deploy new services. The RAN intelligent controller 104 may perform data processing and apply artificial intelligence (AI) or machine learning (ML) models to data trafficked over the system 100. The RAN intelligent controller 104 may perform real-time automation and enable proactive network resource management and service differentiation.

The RAN intelligent controller 104 may perform a self-organizing network (SON) function. According to the SON function, the RAN intelligent controller 104 may receive information from the element management system 105 on the operation of the system 100 or gNB 114. The RAN intelligent controller 104 may evaluate the information and change operating parameters (for example, resource utilization) of the system 100 or gNB 114 to perform load balancing or optimize the operation of the network.

The element management system 105 is connected to the central unit 106, the distributed unit 108 and the RAN intelligent controller 104. The element management system 105 may include a server configured to manage the central unit 106 and the distributed unit 108 and disaggregate the central unit 106 and the distributed unit 108 into the respective services and control plane and user plane functions that the central unit 106 and the distributed unit 108 respectively provide. The element management system 105 may monitor the functions performed by the central unit 106 and the distributed unit 108.

The element management system 105 may receive data from the central unit 106, the distributed unit 108 and the RAN intelligent controller 104. The data may indicate a fault, a configuration or a performance of the central unit 106, the distributed unit 108 or the RAN intelligent controller 104. The element management system 105 may optimize the traffic and service of the central unit 106, the distributed unit 108 and the RAN intelligent controller 104 based on the data. The element management system 105 may also evaluate the data to enhance the performance and radio resource management of the central unit 106, the distributed unit 108 and the RAN intelligent controller 104. The element management system 105 may be a virtual server that is hosted and virtualized using underlying computing resources (such as physical servers, routers and memory for data storage, among others). The underlying computing resources may be located in the same data center or different data centers.

The RAN intelligent controller 104 and the central unit 104 are connected to the core network 102. The core network 102 may include one or more computer systems, which may be distributed computer systems. The core network 102 provides access control including user or user equipment 116 authentication for a requested service. The core network 102 also performs routing including voice call and data routing. For example, the core network 102 may route a voice call to a public switched telephone network. The core network 102 may route data from the RAN intelligent controller 104 and the gNB 114 to RAN intelligent controllers and gNBs of other systems.

The RF unit 112 may provide cellular coverage in one or more cells. A cell may be a geographic area in which the RF unit 112 transmits downlink data to the user equipment 116 and receives uplink data from the user equipment 116. For example, the cell may be a sector in which the RF unit 112 provides cellular coverage. The RF unit 112 may use one or more carriers to provide the coverage. For example, the RF unit 112 may use a primary carrier and a secondary carrier. The carrier over which the RF unit 112 provides cellular coverage may be a cell. The carrier may be a communication frequency or a frequency band. The cell may be the carrier or a frequency band thereof.

Figure 2:
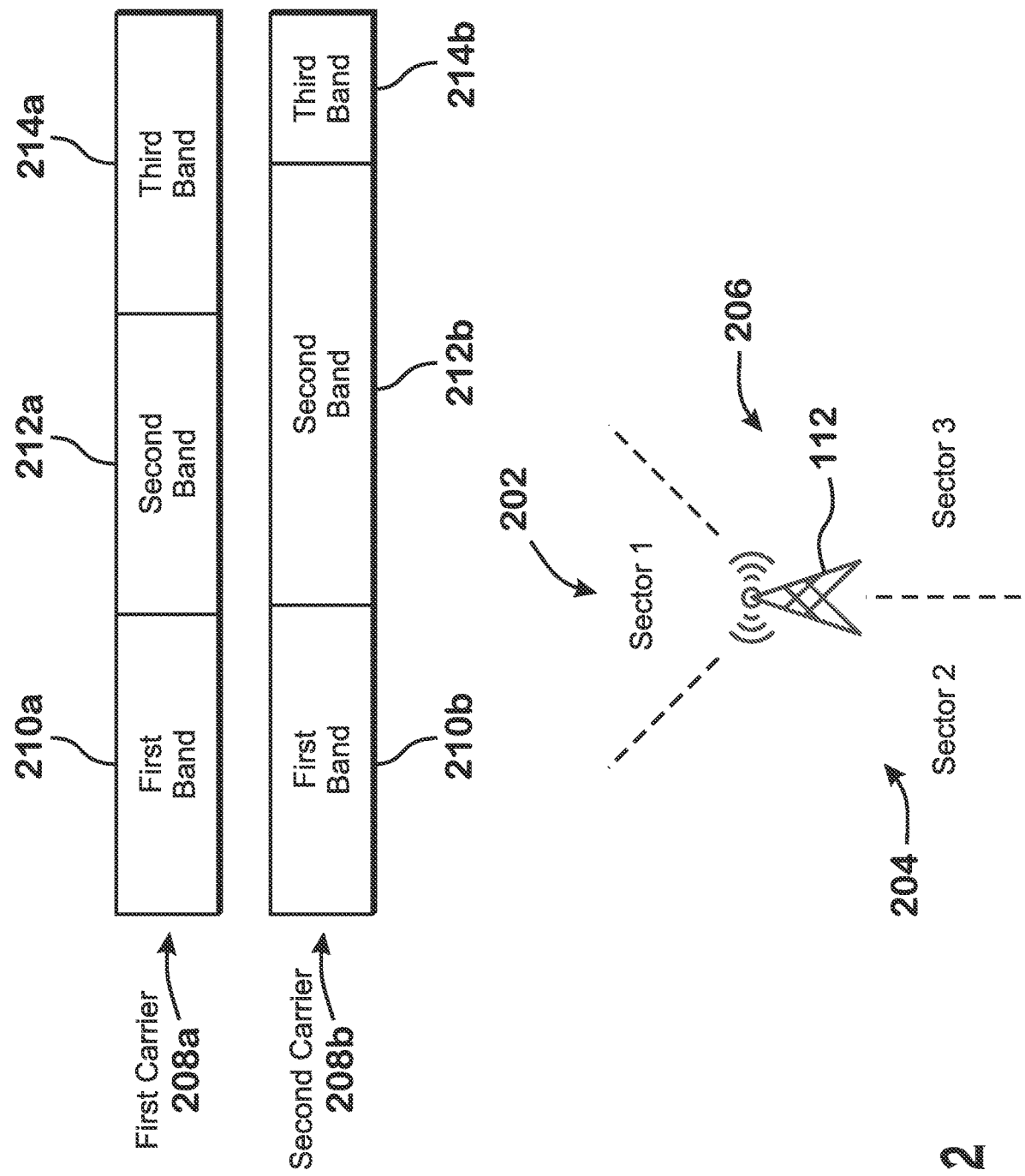
FIG. 2 shows examples of a cell of an RF unit.

FIG. 2 shows examples of a cell of the RF unit 112. A geographic area in a proximity of the RF unit 112 is divided into a plurality of sectors that are shown to include a first sector 202 (denoted 'Sector 1'), a second sector 204 (denoted 'Sector 2') and a third sector 206 (denoted 'Sector 3'). Although the geographic area is shown to be divided into three sectors, any other division may be performed. For example, the area may be divided into two sectors or six sectors or alternatively the entirety of the geographic area may be one sector. An operator may place the RF unit 112 to provide cellular coverage to the user equipment 116 in the sectors 202, 204, 206. The sectors 202, 204, 206 may collectively be a cell of the RF unit 112. Alternatively, any combination of different sectors 202, 204, 206 may be a cell of the RF unit 112 or each individual sector 202, 204, 206 may be a cell.

The RF unit 112 may communicate with the user equipment 116 in one or more sectors 202, 204, 206 using one or more carriers. FIG. 2 shows a first carrier 208a and a second carrier 208b, whereby the first carrier 208a may be a primary carrier and the second carrier 208b may be a secondary or supplementary carrier. The first carrier 208a and the second carrier 208b may each be a cell of the RF unit 112. The first carrier 208a includes first, second and third bands 210a, 212a, 214a and the second carrier 208b includes first, second and third bands 210b, 212b, 214b. One band or a combination of bands of the bands 210a, 212a, 214a, 210b, 212b, 214b of the first and second carriers 208a, 208b may be a cell.

Detection and recovery of a sleeping cell are described herein. A cell is sleeping (i.e., asleep, in a sleep state or in sleep mode) when the RF unit 112 is not responsive in the uplink. A cell may be unresponsive in the uplink if the RF unit 112 does not receive uplink transmissions from the user equipment 116 or if the RF unit 112 does not respond to uplink transmission made by the user equipment 116. It is noted that although the RF unit 112 is referred to herein for ease of description as being unresponsive, a cell may be asleep when the radio unit 110 or the gNB 114 are not responsive. A sleeping cell may be unable to grant the user equipment 116 resources for transmitting uplink data by an uplink transmission. A sleeping cell may not be a malfunctioning cell or a cell having defective hardware. For example, the sleeping cell may not be associated with an alarm indicating malfunction or a defective hardware.

A cell may be in a sleep state because software of the network entity (the RF unit 112, the radio unit 110 or the gNB 114) is a 'hang state' or 'frozen.' For example, the physical hardware of the network entity may be deemed healthy, but a software malfunction causes the cell to be in the sleep state. A cell may be asleep due to a memory leak. A memory leak occurs when the network entity does not release memory resources (for example, of a memory of the network entity) when the resources are no longer in use. Accordingly, the memory resources remain designated as occupied or in use, and the network entity is prevented from reusing the memory resources or reallocating the memory resources to a different flow or process. A cell may be in a sleep state because the network entity does not release radio resources (for example, slots or time-frequency resources, among others) when the radio resources are not in use. Accordingly, the radio resources remain designated as occupied or in use, and the network entity is prevented from reallocating the radio resources to the user equipment 116.

In addition, the cell may be asleep due to an inability of the network entity to optimally prioritize tasks. The cell may be asleep due to the fact that the network entity is clogged or overburdened with requests for access. Thus, the network entity may be unable to respond to the user equipment 116 within a predefined time limit for response, where the predefined time limit for response may be specified by a technical protocol for the system 100. A sleeping cell negatively impacts and reduces radio coverage, and the sleeping cell may result in a 'coverage hole.' That is due to the fact that the user equipment 116 may resort to transitioning another cell or engaging in a handover to the other cell for coverage. For example, the other cell may be a different band of a carrier, a different carrier or a different sector.

Techniques are described herein for the detection and recovery of a sleeping cell.

Figure 3:
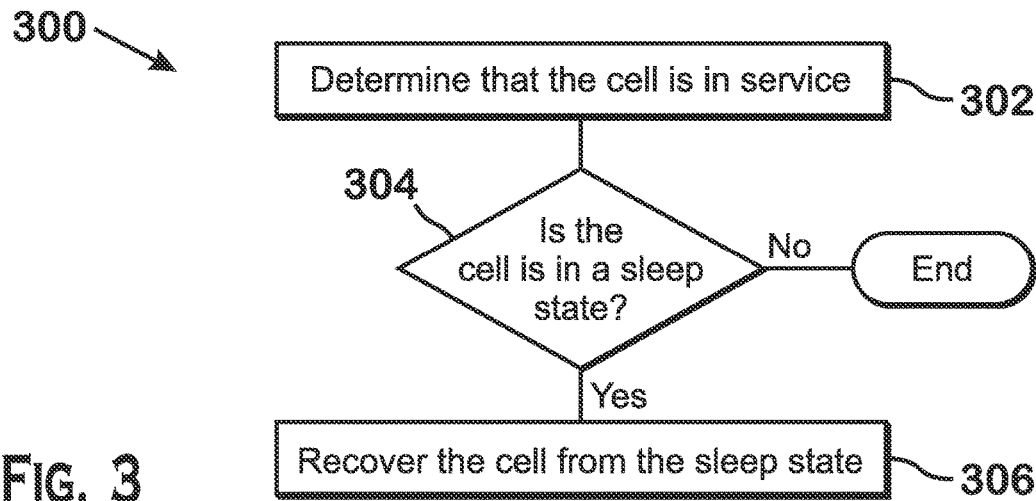
FIG. 3 shows a flow diagram of a method for detection of a cell in a sleep state and recovery of the cell.

FIG. 3 shows a flow diagram of a method for detection of a cell in a sleep state and recovery of the cell. In the method 300, a network entity, which may be one or more servers of the element management system 105, the RAN intelligent controller 104, the central unit 104 or a combination thereof, determines that the cell is in service at 302. In response to a negative determination, the method 300 ends. An unresponsive of the cell to user equipment uplink transmissions may be attributed to a cause other than the cell being in the sleep state. In response to a positive determination, the network entity recovers the cell from the sleep state at 306. Recovering the cell may include rebooting (or restarting) the cell. Rebooting the cell may include performing a software restart on the cell that may reset the cell to a non-sleep state.

Detecting a sleeping cell begins with determining that the cell is in service. A cell is in service, when the gNB 114 is provisioned and actively serving the cell as to provide coverage in the cell for user equipment. The gNB 114 provides coverage by transmitting downlink data to the user equipment and receiving uplink data from the user equipment.

Figure 4:
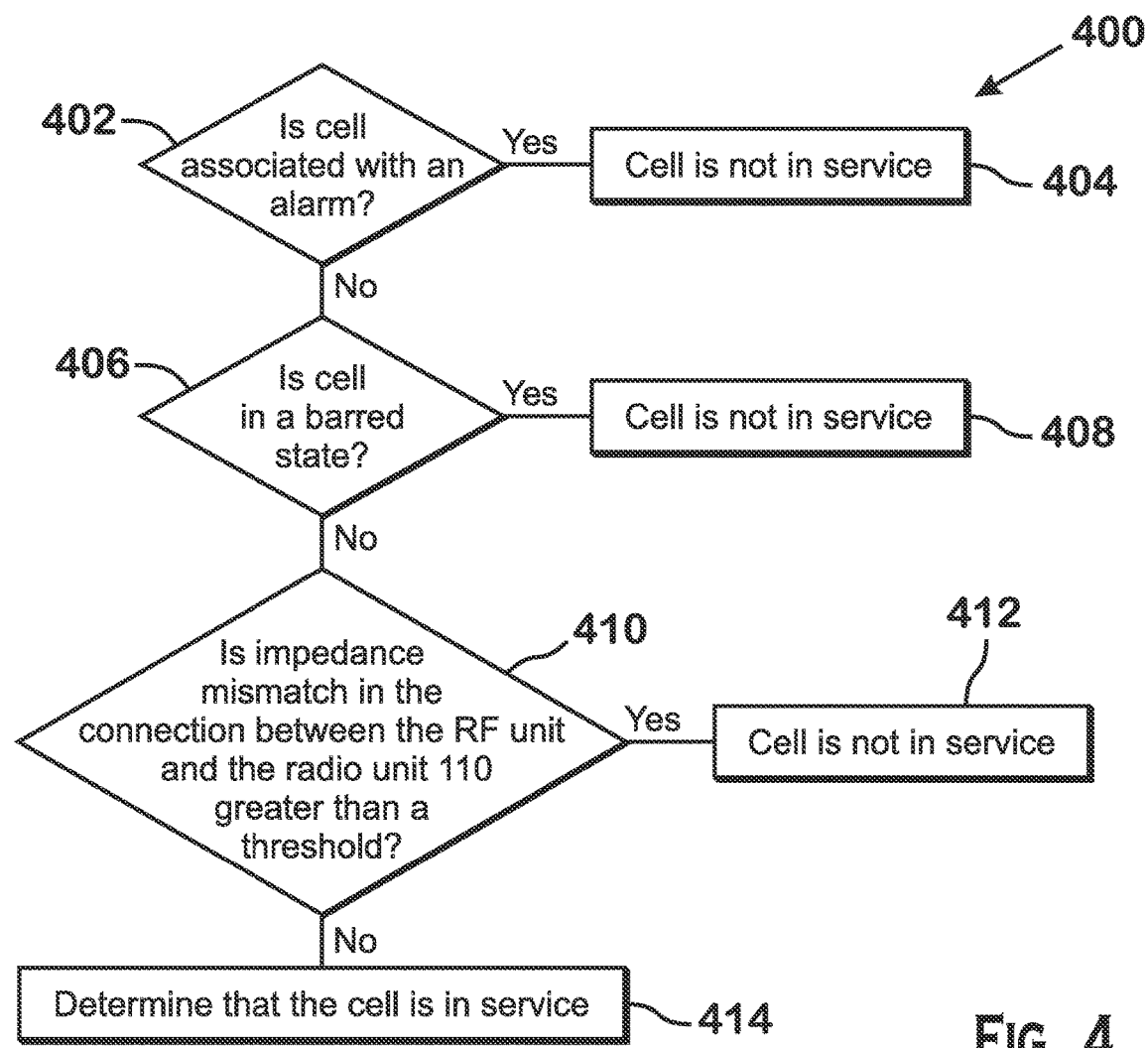
FIG. 4 shows a flow diagram of a method for determining that a cell is in service.

FIG. 4 shows a flow diagram of a method 400 for determining that a cell is in service. In the method 400, a network entity, which may be one or more servers of the element management system 105, the RAN intelligent controller 104, the central unit 104 or a combination thereof, determines whether the cell is associated with an alarm at 402. The alarm may be indicative that the cell has a malfunction, such as a hardware malfunction. Accordingly, any unresponsiveness of the cell is attributable to the malfunction rather than a sleep state. The alarm may indicate that the cell is experiencing resource and memory leak. For example, the element management system 105, the RAN intelligent controller 104 or the central unit 104 may store data indicative of the alarm. The gNB 114 may be aware of the alarm. The network entity may retrieve or receive the data indicative of the alarm. Because the resource leak or memory leak has been identified as occurring in the cell, the network entity may refrain from proceeding to determine whether the cell is in a sleep state. That is due to fact a cause of the unresponsiveness of the cell has already been identified. In response to a positive determination, the network entity, at 404, determines that the cell is not in service.

In response to a negative determination, the network entity proceeds to determining whether the cell is in a barred state at 406. A cell may be placed in a barred state when the cell or the system 100 undergoes maintenance. Barring the cell may include preventing or precluding the cell from providing coverage to the user equipment 116. During the barred state, the cell may not receive uplink data from the user equipment 116. Barring the cell may include as an initial step locking the cell. For example, when the cell is locked, the cell may not receive new calls from the user equipment 116 or initiate data services. Ongoing calls or data services continue to be serviced by cell until they are terminated by the user equipment 116. Alternatively or additionally, the gNB 114 may enforce a time limit upon the expiration of which the gNB 114 terminates the calls or data services. When all calls and data services are terminated maintenance may begin. The element management system 105, the RAN intelligent controller 104 or the central unit 104 may store data indicative of whether the cell is in the barred state or locked state. The network entity may retrieve or receive the data and determine based on the data whether the cell is in service. In response to a positive determination, the network entity, at 408, determines that the cell is not in service.

In response to a negative determination, the network entity proceeds to determining, at 410, whether an impedance mismatch in the connection between the RF unit 112 and the radio unit 110 is greater than a threshold. The impedance mismatch may be measured as voltage standing wave ratio (VSMR) of the connection between the RF unit 112 and the radio unit 110. The connection between the RF unit 112 and the radio unit 110 may be a coaxial cable. A relatively large impedance mismatch may prevent the intermediate frequency signals transmitted by the RF unit 112 from reaching the analog frontend of the radio unit 110. The relatively large impedance mismatch may degrade the intermediate frequency signals. The threshold may represent an acceptable level of impedance mismatch beyond which the communication between the RF unit 112 and the radio unit 110 is impeded.

The VSMR may be measured by field testing. Measuring the VSMR may include irradiating an RF wave that is received by the RF unit 112, detecting an amplitude of an intermediate frequency signal at an analog frontend of the radio unit 110 and determining the VSMR based on the amplitude. In response to a positive determination, the network entity, at 412, determines that the cell is not in service. In response to a negative determination, the network entity determines that the cell is in service at 414.

In order to establish that the cell is in service, the network entity may also verify that external interference on the cell is below a threshold for external interference. Verifying that the external interference is below the threshold rules out that external interference is the cause of the cell's inability to receive user equipment uplink transmissions. Accordingly, the network entity proceeds to evaluating the cell's sleep state to determine whether the sleep state prevents user equipment transmission from reaching the gNB 114.

After determining that the cell is in service, the network entity proceeds to determining whether the cell is in a sleep state. The sleep state may prevent the gNB from receiving or responding to communications sent by the user equipment 116. If the cell is determined to be in a sleep state, the network entity proceeds to recovering the cell as described herein, whereby recovering the cell causes the cell to exist the sleep state.

Figure 5:
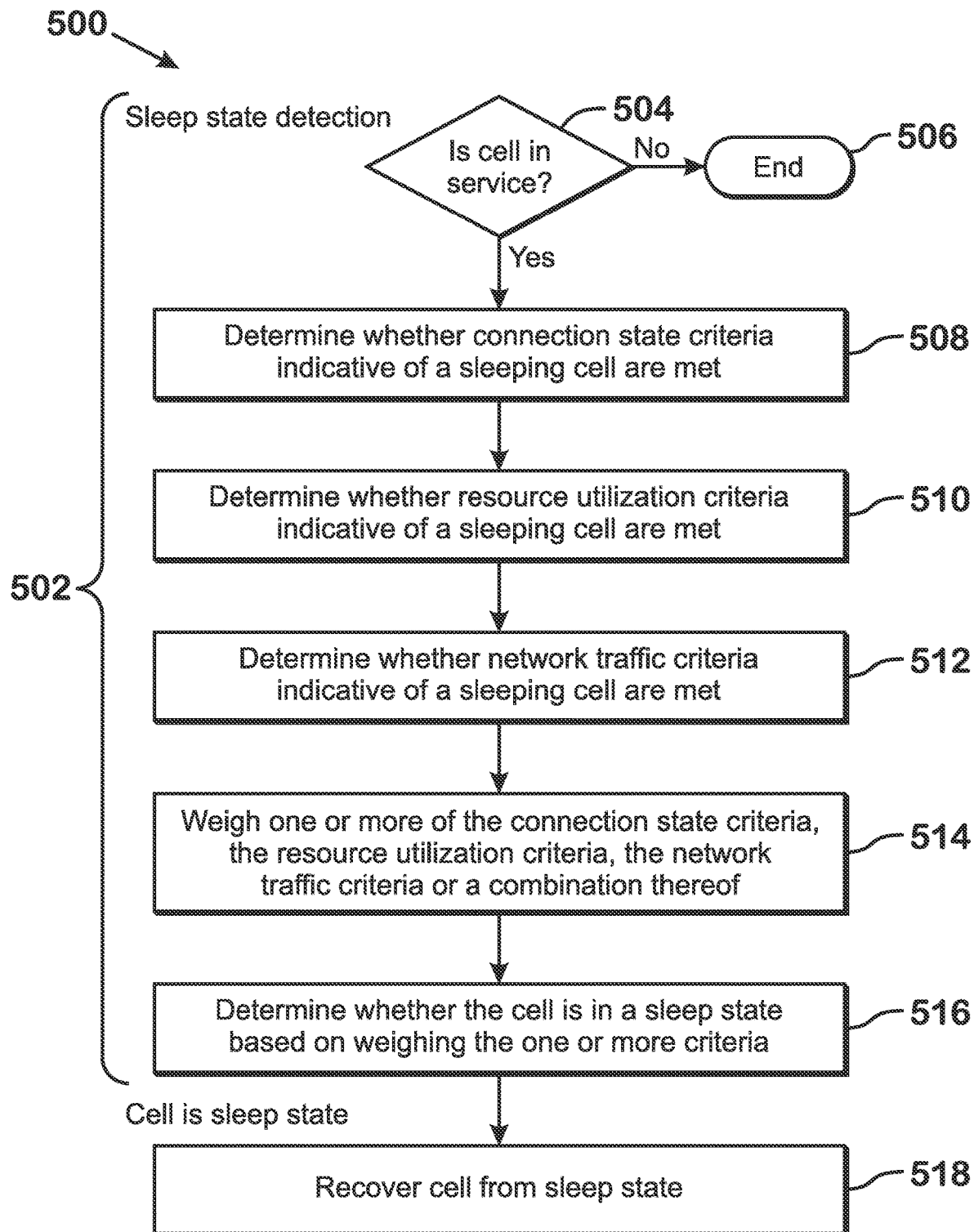
FIG. 5 shows a flow diagram of a method for detecting and recovering a sleeping cell.

FIG. 5 shows a flow diagram of a method 500 for detecting and recovering a sleeping cell. Detecting a sleeping cell includes determining whether one or more criteria indicative of a sleeping cell are met. In the method 500, a network entity, which may be one or more servers of the element management system 105, the RAN intelligent controller 104, the central unit 104 or a combination thereof, detects whether the cell is in a sleep state at 502. To detect whether the cell is in a sleep state, the network entity determines whether a cell is in service at 504. The network entity may determine whether the cell is in service by performing the method 400 described herein. In response to a negative determination, the network entity reaches an end of the detection and recovery technique at 506. That is due to the fact that if the cell is not in service, then the fact that the cell is in a sleep state may be immaterial or may not accurately assess the state of the cell.

In response to a positive determination, the network entity determines, at 508, whether connection state criteria indicative of a sleeping cell are met. Determining whether the connection state criteria indicative of a sleeping cell are met may include determining whether one or more random access channel (RACH) criteria indicative of a sleeping cell are met, one or more channel measurement criteria indicative of a sleeping cell are met, one or more cell handover criteria indicative of a sleeping cell are met, one or more cell connection statistics criteria indicative of a sleeping cell are met, one or more connected user equipment criteria indicative of a sleeping cell are met, one or more measurement change criteria indicative of a sleeping cell are met or a combination of the criteria are met.

Figure 6:
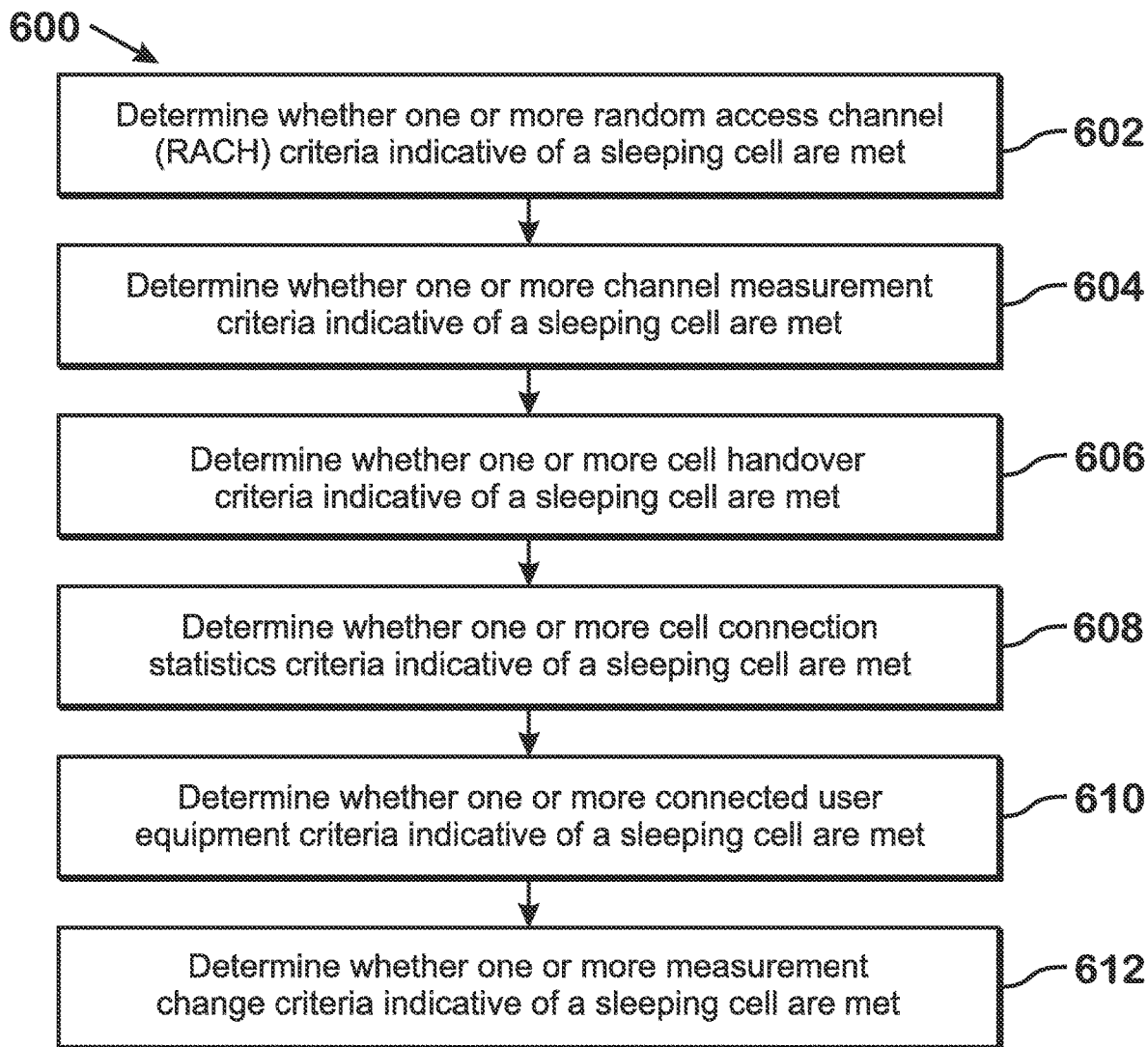
FIG. 6A shows a flow diagram of a method for determining whether connection state criteria indicative of a sleeping cell are met.
FIG. 6B shows a plurality of timestamps stored by the gNB of FIG. 1 in association with the number of connected user equipment.

Referring to FIG. 6A, FIG. 6A shows a flow diagram of a method 600 for determining whether connection state criteria indicative of a sleeping cell are met. In the method 600, the network entity, which may be one or more servers of the element management system 105, the RAN intelligent controller 104, the central unit 104 or a combination thereof, determines, at 602, whether one or more random access channel (RACH) criteria indicative of a sleeping cell are met. The user equipment 116 sends makes a RACH request to the gNB 114 in the cell prior to receiving a grant for to transmit data on a data channel. The RACH request may be a physical random access channel (PRACH) preamble that is randomly selected by the user equipment 116. The user equipment 116 may make the RACH request to synchronize the user equipment's 116 timers with those of the gNB 114 and to obtain resource authorization to make a radio resource control (RRC) Connection Request.

The user equipment 116 may make the RACH request because the user equipment 116 has moved or relocated to a new geographic area that is part of the cell, the user equipment 116 is transitioning to a different carrier that is part of the cell, the user equipment 116 is transitioning to using a different band that is part of the cell, among others. The user equipment 116 may be seeking to connect to the gNB 114 in the new cell. The user equipment 116 may make the RACH request due to the fact that the user equipment 116 was in an idle state (in which the user equipment 116 is not transmitting or receiving user data) and is seeking to transition to a "connected state." It is noted that in the idle state the user equipment 116 may transmit and receive control data. For example, if the user equipment 116 seeks to transmit or receive user data, the user equipment 116 may transition from an idle state to a "connected state" and may make a RACH request to the gNB 114. Similarly, the user equipment 116 may make the RACH request to transition from a discontinuous reception (DRX) state. Further, the user equipment 116 may make the RACH request to request a buffer status report (BSR).

If a first RACH request fails to solicit a response from the gNB 114, the user equipment 116 may retransmit the RACH request (or send a second subsequent RACH request). Thus, an increase in the number of RACH requests received by the gNB 114 is indicative of a failure by the gNB 114 in responding to the RACH requests.

The gNB 114 may increment a counter every time that a RACH request is received. The counter may represent a number of RACH requests made by user equipment in a period of time. The network entity may receive (or retrieve) data indicative of a count that the counter reaches and may determine that the one or more RACH criteria is met in response to the count being greater than a threshold. The threshold may be an average of number of RACH requests historically received over a period of time (such as, 10 minutes or 30 minutes), and the count of the number of RACH requests may be determined for the same period of time. Using the same periods of time for the threshold and the count is advantageous in that it ensures that the threshold is representative of an expected count. Further, to reduce false positives, the threshold may be greater than the historical average, such as 140%, 180% or 300% of the historical average. If the number of RACH requests indicated by the counter exceeds the threshold, then a RACH criterion indicative of a sleeping cell is deemed to be met. Conversely, if the number of RACH requests indicated by the counter is less than the threshold, then a RACH criterion indicative of a sleeping cell is not deemed to be met.

The network entity, which may be one or more servers of the element management system 105, the RAN intelligent controller 104, the central unit 104 or a combination thereof, determines, at 604, whether one or more channel measurement criteria indicative of a sleeping cell are met. The user equipment's 116 failure to obtain resource authorization to make an RRC Connection Request may be attributed to poor channel conditions as opposed to a cell being in a sleep state. Poor channel conditions in the cell may prevent the gNB 114 from receiving the RACH request and, consequently, respond to the RACH request. The network entity may rule out poor channel conditions as a cause by determining that one or more channel measurement criteria indicative of the sleeping cell are met. The one or more channel measurement criteria may be met if a channel measurement, such as a channel quality indicator (CQI), signal-to-noise ratio (SNR), signal-to-interference plus noise ratio (SINR), signal-to-noise plus distortion ratio (SNDR), received signal strength indicator (RSSI) or reference signal received power (RSRP), made in the cell is greater than a threshold for channel measurement. The threshold for channel measurement may be an average of channel measurements historically made in the cell. The threshold for channel measurement may represent an expected channel measurement for the cell. To reduce false positives, the threshold may be less than the historical average, such as 50% or 80% of the historical average. If the channel measurement exceeds the threshold, then cell measurements are indicative of radio conditions that support RACH request and resource authorization traffic. Accordingly, RACH failure is more likely to be attributed to a sleeping cell rather than poor radio condition. Conversely, if the channel measurement is less than the threshold, then the radio conditions may be deemed to be poor and the channel measurement criterion indicative of the sleeping cell is not deemed to be met.

It is noted that the channel measurement may be made by the user equipment 116 and reported to the gNB 114 or the channel measurement may be made by the gNB 114. If the network entity performing the criterion evaluation stores channel measurement reports, then the network entity may retrieve the channel measurement reports for determining whether a criterion is met. Alternatively, if a different entity stores the channel measurement reports, then the network entity may receive the channel measurement reports from the different entity for determining whether the criterion is met.

The network entity determines, at 606, whether one or more cell handover criteria indicative of a sleeping cell are met. The network entity may determine whether the one or more cell handover criteria are met based on a proportion of user equipment 116 that perform RRC connection reestablishment with a neighboring cell. For example, a cell that is a 120° sector may have a neighboring cell that is also a 120° sector. The user equipment 116 may relocate and undergo a handover from the neighboring cell to the cell. However, the user equipment 116 may be unable to perform an RRC connection establishment in the cell if the cell is in a sleep state. Accordingly, the user equipment 116 may go back and reestablish RRC connection in the neighboring cell. The user equipment 116 may do so even though radio conditions (for example, as indicated by channel measurement) are more favorable in the cell than the neighboring cell. For example, the RSSI or the RSRP may be higher in the cell than the neighboring cell.

The gNB 114 may track when the user equipment 116 attempts a handover from the neighboring cell to the cell. The gNB 114 may also track when the user equipment 116 reverts back to the neighboring cell and attempts connection reestablishment in the neighboring cell. The gNB 114 may track the identity of the user equipment 116, cell and neighboring cell. The gNB 114 may store data representative of tracking cell-to-neighboring cell handover attempts and neighboring cell-to-cell connection reestablishment.

The network entity may retrieve or receive the data representative of the tracking. The network entity may determine that the one or more cell handover criteria are met when the proportion of user equipment 116 that perform connection reestablishment with the neighboring cell is greater than a threshold, which may be 20%, 50% or 100%. For example, if all of the user equipment 116 that attempted cell-to-neighboring cell handover later reestablished connection with the neighboring cell, then it is likely that the cell is in a sleep state. Conversely, if only 10% of the user equipment 116 that attempted cell-to-neighboring cell handover later reestablished connection with the neighboring cell, then the connection reestablishment may be attributed to other factors, such as user equipment 116 movement, among others.

It is noted that the network entity may determine whether the one or more cell handover criteria are met for multiple neighboring cells. As described herein, the neighboring cell may be in a different carrier, a different frequency band of the carrier or a different sector than the cell. The network entity may determine that the cell handover criterion is met if the criteria is met for a majority of the multiple neighboring cells. Conversely, if the cell handover criterion is not met if the criteria is met for less than 50% of the multiple neighboring cells.

A cell handover criterion may be met if the handover success rate is greater than a threshold for handover success. The threshold for handover success may be a 'golden parameter' for the handover success that is established by an operator of the system 100. The 'golden parameter' may be a preferred or an acceptable threshold below which a warning or a flag is issued or the cell is deemed to be asleep. Similarly, other thresholds may also be 'golden parameters' that are preferred or acceptable thresholds in relation to which a warning or a flag is issued or the cell is deemed to be asleep.

The network entity determines, at 608, whether one or more cell connection statistics criteria indicative of a sleeping cell are met. Determining whether the one or more cell connection statistics criteria indicative of the sleeping cell are met may include comparing a number of user equipment that are connected to the cell with a number of user equipment that are connected to other cells (or a function thereof, such as an average, median, mode or minimum, among others). The other cells may be neighboring cells. The gNB 114 may store data indicative of the number of user equipment that have an RRC connection in various cells. The network entity may receive or retrieve the data (depending on whether the network entity stores the data as described herein). The network entity may then compare the number of user equipment that are connected to the cell with an average, median, mode of other function of the number of user equipment that are connected to other cells.

For example, the network entity may determine that a cell connection statistics criterion is met if the number of user equipment that are connected to the cell is less than a minimum of a plurality of numbers of user equipment in the plurality of evaluated cells, respectively. Accordingly, the cell connection statistics criterion is met if the cell has the least number of connected user equipment. Alternatively, the network entity may determine that a cell connection statistics criterion is met if the number of user equipment that are connected to the cell is less than an average of the plurality of numbers of user equipment connected to the plurality of other cells, respectively. Accordingly, the cell connection statistics criterion is met if the cell has a number of connected user equipment that is less than an average number for evaluated cells. It is noted that any function of the number of connected user equipment may be used. For example, the function may be 50% of the average of the plurality of numbers of connected user equipment in a plurality of evaluated cells, respectively. The plurality of evaluated cells may include or exclude the cell whose sleep status is sought to be determined.

The network entity determines, at 610, whether one or more connected user equipment criteria indicative of a sleeping cell are met. A connected user equipment criterion is met when the number of user equipment connected in the cell (e.g., the user equipment having an RRC connected state in the cell) does not change over a period of time. Further, a connected user equipment criterion is met when the number of user equipment connected in the cell abruptly changes and become zero. The gNB 114 may store timestamps, each indicating a time instance and that are each associated with the number of user equipment connected in the cell at the time instance.

Referring to FIG. 6B, a plurality of timestamps stored by the gNB 114 in association with the number of connected user equipment are shown. The gNB 114 stores first, second, third, fourth, fifth and sixth timestamps 620a, 620b, 620c, 620d, 620e, 620f in memory. The timestamps 620a, 620b, 620c, 620d, 620e, 620f are stored in association with first, second, third, fourth, fifth and sixth numbers of connected user equipment 622a, 622b, 622c, 622d, 622e, 622f. A timestamp 620 may represent the time at which the respective number of connected user equipment 622 is stored or determined. Although six timestamps 620 and respective numbers of connected user equipment 622 are shown, it is noted that the gNB 114 may store any other number.

The network entity may receive data indicative of the timestamps 622 and, for each timestamp, the number of user equipment 622 connected in the cell at the timestamp. Receiving the data may include retrieving the data from memory of the network entity. The network entity may then evaluate the data. If the network entity determines that at one time instance, the number of user equipment connected in the cell is non-zero and at a subsequent time instance, the number of user equipment connected in the cell becomes zero, then the network entity determines that a connected user equipment criterion indicative of a sleeping cell is met.

For example, the cell may have entered a sleep state and released the RRC connection to all user equipment.

The network entity then determines that the number of user equipment connected in the cell has stayed unchanged and constant (for example, at two user equipment for fourth, fifth and sixth timestamps 620d, 620e, 620f) for a duration of time covering multiple time stamps (from 00:04 to 00:06). The network entity determines that a connected user equipment criterion indicative of a sleeping cell is met. The fact that the number of connected user equipment does not change indicates that the cell potentially failed to connect new users, release old users or accurately report the number of connected users. Conversely, a criterion is not met if the number of connected user equipment changes over the duration of time, the number of connected user equipment remains greater than zero or both (as reflected in the first, second and third numbers of connected user equipment 622a, 622b, 622c).

Referring back to FIG. 6A, the network entity determines whether one or more measurement change criteria indicative of a sleeping cell are met at 612. Radio conditions in the cell change frequently or continuously. Measurement reporting by the user equipment 116 (for example, using the CQI) indicates the radio conditions and is also expected to change. A cell that is in a sleep state may fail to process measurement reporting made the user equipment 116 and fail to update the gNB 114 with new measurement reports made by the user equipment 116. Measurement reporting conveyed to the gNB 114 may remain unchanged (or 'stuck' at an old measurement report) due to the sleep state of the cell.

The gNB 114 may store timestamps, each indicating a time instance, and that are each associated with a measurement report made by the user equipment 114. The network entity may receive data indicative of the timestamps and, for each timestamp, the measurement report made by the user equipment 114at. Receiving the data may include retrieving the data from memory of the network entity in the event that the network entity evaluating the criterion is also storing the timestamps and associated measurement report. The network entity may then evaluate the data.

If the network entity determines that the measurement reports have stayed unchanged and constant for a duration of time covering multiple time stamps, then the network entity determines that a measurement change criterion indicative of a sleeping cell is. Conversely, a criterion is not met if the measurement reports change over the duration of time as anticipated given the changing radio conditions of the cell.

Referring back to FIG. 5, after the network entity determines, at 508, whether the connection state criteria indicative of a sleeping cell are met, the network entity determines, at 510, whether resource utilization criteria indicative of a sleeping cell are met. As described herein, determining whether resource utilization criteria are met may include determining whether one or more PUCCH criteria indicative of a sleeping cell are met, determining whether one or more throughput criteria indicative of a sleeping cell are met, determining whether one or more PRB utilization criteria indicative of a sleeping cell are met, determining whether one or more PDCCH utilization criteria indicative of a sleeping cell are met, determining whether one or more transmit or receive power criteria indicative of a sleeping cell are met, determining whether one or more modulation and coding scheme criteria indicative of a sleeping cell are met, determining whether one or more block error rate (BLER) criteria indicative of a sleeping cell are met, determining whether one or more supplemental downlink criteria indicative of a sleeping cell are met or a combination thereof.

Figure 7:
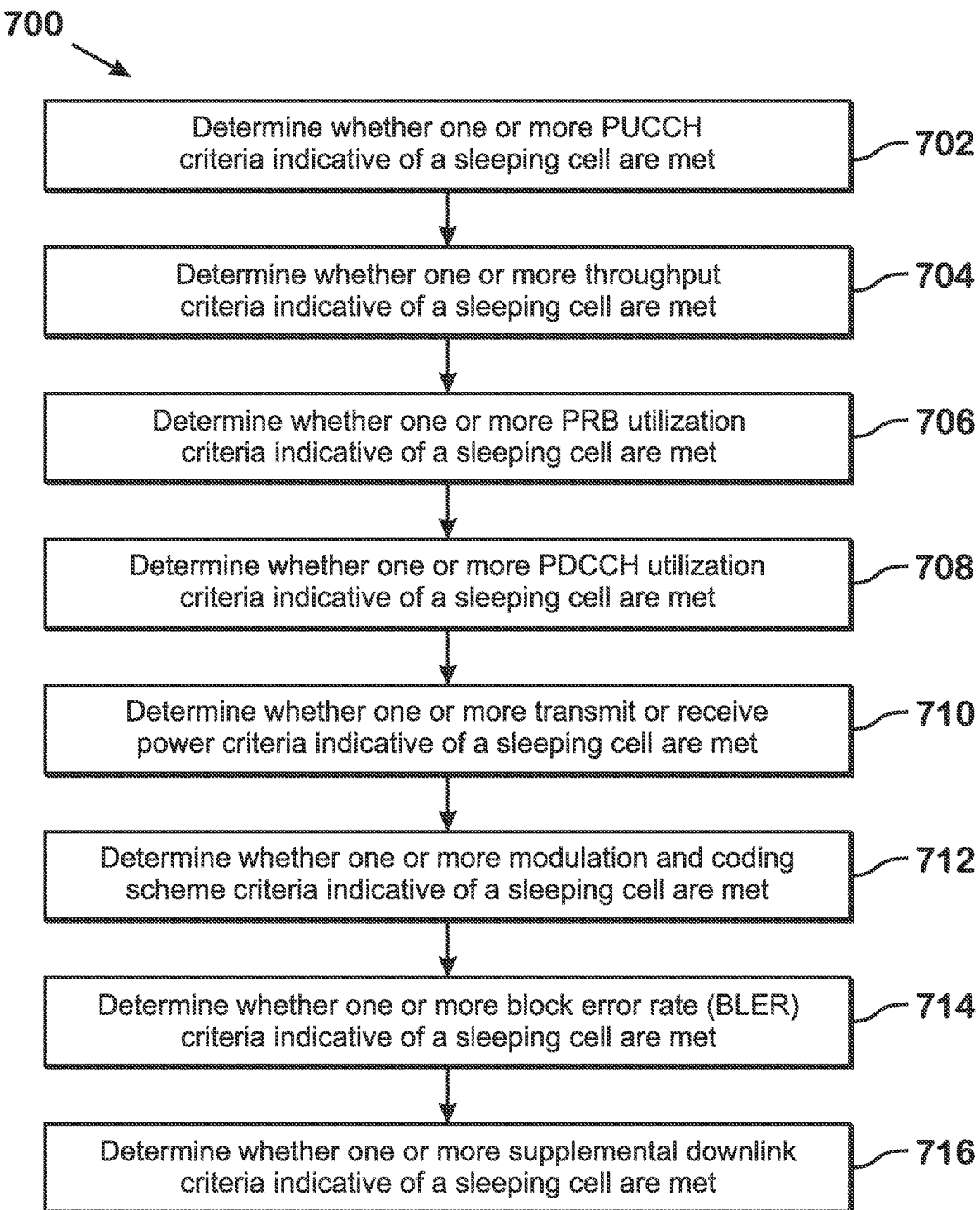
FIG. 7 shows a flow diagram of a method for determining whether resource utilization criteria indicative of a sleeping cell are met.

FIG. 7 shows a flow diagram of a method 700 for determining whether resource utilization criteria indicative of a sleeping cell are met. In the method 700, the network entity determines, at 702, whether one or more physical uplink control channel (PUCCH) criteria indicative of a sleeping cell are met. The user equipment 116 transmits the PUCCH to the gNB 114 to provide an acknowledgement/non-acknowledgement (ACK/NACK) for downlink transport blocks transmitted by the gNB 114 to the user equipment 116. The ACK/NACK may be transmitted according to hybrid automatic repeat request (HARQ) process. The user equipment 116 also transmits channel state reports and scheduling requests (for uplink data transmissions) to the gNB 114 using the PUCCH.

Figure 8:
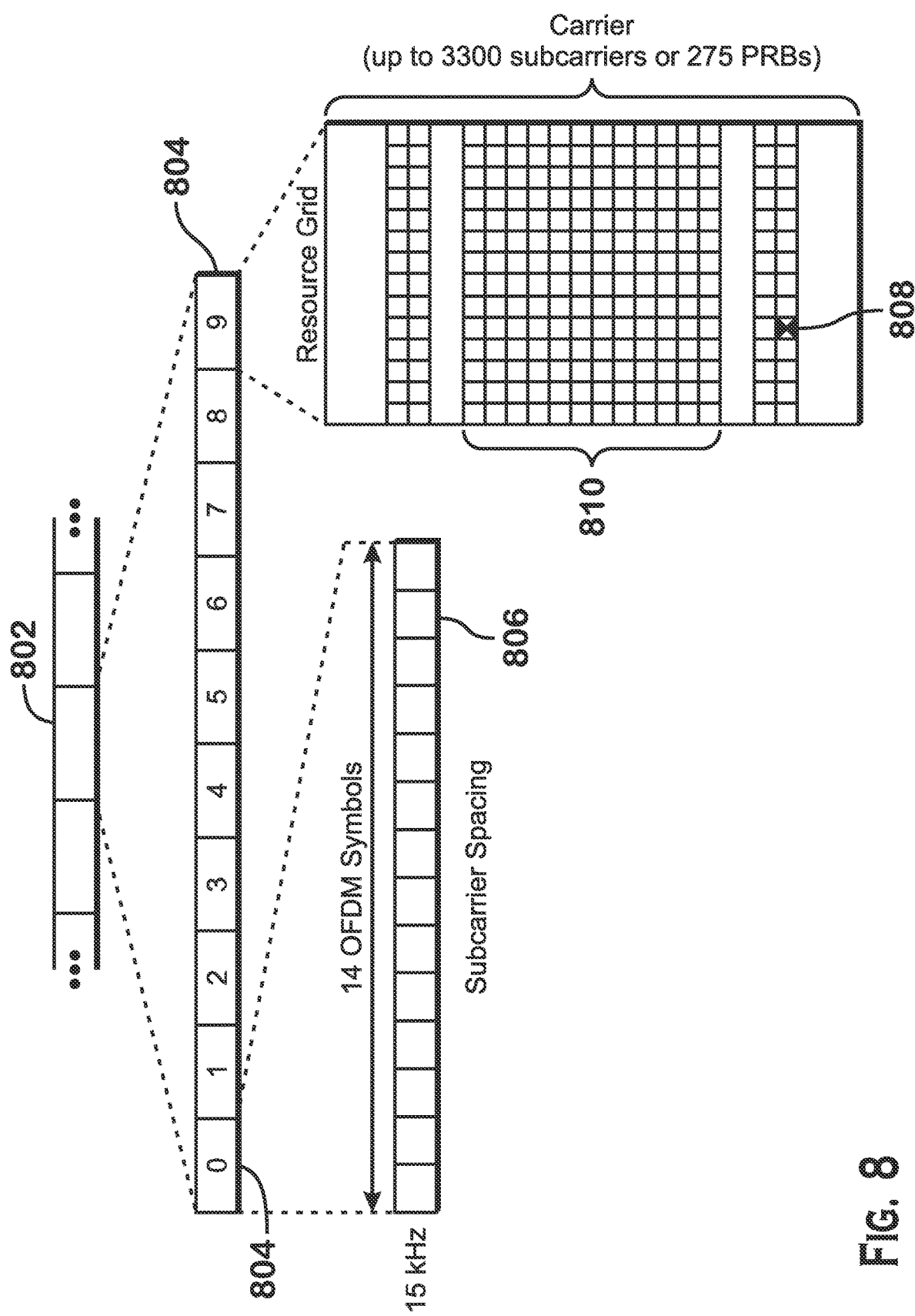
FIG. 8 shows an example of physical radio resource of a frame structure.

FIG. 8 shows an example of physical radio resource of a frame structure. The physical radio resource includes resource elements and physical resource blocks (PRBs). A frame 802, which may be 10 milliseconds (ms) in duration, is divided into ten subframes 804, which may each be 1 ms in duration. The subcarrier spacing may be 15 kilohertz (kHz). Each subframe includes 14 orthogonal frequency-division multiplexing (OFDM) symbols. A resource element 808 represents one symbol over one subcarrier. A PRB 810 covers all slot symbols across 12 subcarriers. It is noted that a carrier may have up to 3300 subcarriers or 275 PRBs.

Referring back to FIG. 7, the network entity may determine that a PUCCH criterion indicative of a sleeping cell is met when the user equipment's 116 use of resource elements dedicated for the PUCCH or PRBs dedicated for the PUCCH is below a threshold. Conversely, the network entity may determine that the PUCCH criterion indicative of a sleeping cell is not met when the user equipment's 116 use of (e.g., number of) resource elements dedicated for the PUCCH or PRBs dedicated for the PUCCH is greater than the threshold.

The fact that the user equipment 116 does not sufficiently utilize PUCCH resources suggests that the user equipment 116 does not sufficiently transmit ACK/NACK for downlink transport blocks. The cause of the relatively low PUCCH resource utilization may be that the cell is in a sleep state and the does not transmit downlink transport blocks for the user equipment 116 to acknowledge or non-acknowledge. The threshold may be a function (e.g., average or median) PUCCH resource utilization of user equipment in other cells, such as neighboring cells.

The PUCCH resource utilization may be reported to the gNB 114 and tracked and stored by the gNB 114. The PUCCH resource utilization for the user equipment 116 may be stored by the network entity or other network entities together with a timestamp indicating a time instance associated with the PUCCH resource utilization.

The network entity may determine that a PUCCH criterion indicative of a sleeping cell is met when the PUCCH resource utilization for user equipment in the cell remains relatively constant without change. As described herein in relation to measurement reporting change, the network entity may access the PUCCH resource utilization stored together with associated timestamps and determine whether the PUCCH resource utilization changes over time or not. The network entity may determine that the PUCCH criterion indicative of the sleeping cell is met when the PUCCH resource utilization for user equipment in the cell remains constant over a time period without changing or does not deviate by more than a specified percentage (such, as 20%). If the PUCCH resource utilization changes at all or by more than the specified percentage over the time period, then the network entity may determine that the PUCCH criterion indicative of the sleeping cell is not met.

Similar to determining whether the one or more PUCCH criteria indicative of a sleeping cell are met, the network entity determines whether one or more throughput criteria indicative of a sleeping cell are met. The network entity determines, at 704, whether one or more throughput criteria indicative of a sleeping cell are met. The throughput criteria may relate to uplink or downlink throughput. Throughput is the amount of data (for example, as measured in bits or bytes) that is transmitted from the user equipment 116 to the gNB 114 in the uplink or the gNB 114 to the user equipment 116 in the downlink. The network entity may determine that a throughput criterion indicative of a sleeping cell is met when the user equipment's 116 uplink or downlink throughput is below a threshold. Conversely, the network entity may determine that the throughput criterion is not met when the throughput is greater than the threshold. Like, PUCCH resource utilize, the lack of sufficient throughput indicates that the cell is in a sleep state and does not transmit downlink data or receive uplink data. As described herein, the threshold may be a function of the throughput of user equipment in other cells, such as neighboring cells. The throughput may be reported to the gNB 114 and tracked and stored by the gNB 114 together with timestamps. The network entity may determine that the throughput criterion is met when the throughput remains relatively constant without change. As described herein, the network entity may access the throughput stored together with associated timestamps and determine whether the throughput changes over time or not. The network entity may determine that the throughput criterion is met when the throughput in the cell remains constant over a time period without changing or does not deviate by more than a specified percentage (such, as 20%). If the throughput changes at all or by more than the specified percentage over the time period, then the network entity may determine that the throughput criterion is not met.

The network entity determines, at 706, whether one or more PRB utilization criteria indicative of a sleeping cell are met. The PRB utilization may be the number of PRB used by a user equipment to transmit downlink data or receive uplink data or the percentage of PRBs used by the user equipment to transmit downlink data or receive uplink data to a total number of PRBs available to the user equipment.

The network entity may determine that a PRB utilization criterion is met when the user equipment's 116 use of PRBs for the uplink or downlink is below a threshold. The network entity may determine that the PRB utilization criterion is met when the PRB utilization of all user equipment that have an RRC connection in the cell is below a threshold. The threshold may be a 'golden parameter' for PRB use. The PRB utilization may be an average or median PRB utilization of user equipment that have an RRC connection in the cell. The threshold may, accordingly, be on a per user equipment basis. The network entity may determine that the PRB utilization criterion is not met when the PRB utilization is greater than the threshold. Like, PUCCH resource utilize, a reduction in PRB utilization indicates that user equipment in the cell are not using resources for uplink and downlink transmission due to the fact that the cell is in a sleep state. As described herein, the threshold may be a function of the PRB utilization of user equipment in other cells, such as neighboring cells. The PRB utilization may be reported to the gNB 114 and tracked and stored by the gNB 114.

The network entity determines, at 708, whether one or more physical downlink control channel (PDCCH) utilization criteria indicative of a sleeping cell are met. The gNB 114 transmits downlink control information to user equipment in the cell using the PDCCH. The amount of control data transmitted in the downlink increases to scale up when the number of connected user equipment increases and decreases to scale down when the number of connected user equipment decreases. PDCCH utilization is the amount of data (for example, as measured in bits or bytes) that is transmitted over the PDCCH from the gNB 114 to the user equipment in the cell. An absence of changes in PDCCH utilization over time is indicative of a sleeping cell that does not scale up or down to account for increases or decreases in user equipment connected in the cell. Similar to PUCCH resource utilization, the network entity or other network entities stores PDCCH utilization together with a timestamp indicating a time instance associated with the stored utilization.

The network entity may access the stored PDCCH utilization together with associated timestamps and determine whether the PDCCH utilization changes over time or not. The network entity may determine that the PDCCH utilization criterion is met when the PDCCH utilization in the cell remains constant over a time period without changing or does not deviate by more than a specified percentage (such, as 5% or 10%). If the PDCCH utilization changes at all or by more than the specified percentage over the time period, then the network entity may determine that the PDCCH utilization criterion is not met.

The network entity determines, at 710, whether one or more transmit or receive power criteria indicative of a sleeping cell are met. If the cell transitions to a sleep state and releases the connections of user equipment, then the transmit power used by the gNB 114 to transmit downlink data is expected to decrease. For example, without data to transmit, the gNB 114 may select a lowest transmit power setting available. Further, if the cell transitions to a sleep state and ceases to process or evaluate ACK/NACK feedback received from user equipment in the cell, then the gNB 114 may not adjust its downlink transmit power or uplink receive power. Typically, ACK/NACK feedback causes the gNB 114 to adjust transmit power. However, if the gNB 114 does not receive the ACK/NACK feedback, the gNB 114 may not be triggered to adjust the transmit power.

The network entity may determine that a transmit or receive power criterion is met when the transmit power is set to a lower transmit power setting available. Further, the network entity may determine that a transmit or receive power criterion is met when the transmit power decreases or when the transmit power does not change over time. Conversely, the network entity may determine that the criterion is not met when the transmit power is not set to a lower transmit power setting available, when the transmit power increases or when the transmit power change over time.

The network entity may compare the transmit or receive power in cell to the lowest transmit power setting available. The network entity may determine that the criterion is met when the transmit or receive power in cell is the same as the lowest transmit power setting available to the cell. The network entity may determine that the criterion is not met when the transmit or receive power in cell is different from the lowest transmit power setting available to the cell. For example, a communication protocol used in the system 100, such as Fifth Generation New Radio (5G NR), may specify the lowest transmit power setting available to the cell.

The network entity may determine a threshold for the transmit or receive power as the transmit or receive power used by another cell, such as a neighboring cell, or as a function (for example, median or minimum) of the transmit or receive powers used by multiple other cells, such as multiple neighboring cells. The network entity may compare the transmit or receive power of the cell to the threshold for the transmit or receive power. The network entity may determine that the criterion is met when the transmit or receive power of the cell is less than the threshold for the transmit or receive power and vice-versa.

As described herein in relation to other communication parameters and measurements, the network entity or other gNB 114 entities may track and store values of the transmit or receive power of the cell over time (e.g., together with time stamps). The network entity may access the transmit or receive power and determine whether the power changes over time or not. The network entity may determine that the criterion is met when the power remains constant over a time period without changing or does not deviate by more than a specified percentage (such, as 10%). If the power changes at all or by more than the specified percentage over the time period, then the network entity may determine that the criterion indicative of the sleeping cell is not met.

When the cell transitions to a sleep state and releases the connections of user equipment or ceases to process or evaluate ACK/NACK feedback received from user equipment, then the gNB 114 may not adjust the modulation and coding scheme used to transmit downlink data. The network entity uses the modulation and coding scheme employed in the cell to determine whether the cell is in a sleep state. At 712, the network entity determines whether one or more modulation and coding scheme criteria indicative of a sleeping cell are met. Like transmit power or receive power, the network entity may determine that a modulation and coding scheme criterion is met when the modulation and coding scheme used by cell is set to a lowest modulation and coding scheme available. A lowest modulation and coding scheme may be a least robust or least error-resilient modulation and coding scheme available to the cell. Conversely, the network entity may determine that the criterion is not met when the modulation and coding scheme is not set to a lowest modulation and coding scheme available to the cell.

Further, the network entity may determine that a modulation and coding scheme criterion is met when the modulation and coding scheme changes from a less robust or error-resilient modulation and coding scheme to a more robust or error-resilient modulation and coding scheme, when the modulation and coding scheme changes over time or when the modulation and coding scheme used in the cell is more robust or error-resilient than a modulation and coding scheme used in another cell (such as a neighboring cell). Conversely, the network entity may determine that a modulation and coding scheme criterion is not met when the modulation and coding scheme does not change from a less robust or error-resilient modulation and coding scheme to a more robust or error-resilient modulation and coding scheme, when the modulation and coding scheme does not change over time or when the modulation and coding scheme used in the cell is more robust or error-resilient than a modulation and coding scheme used in the other cell. As described with reference to FIG. 6B, the modulation and coding scheme used by the gNB 114 may be similarly be stored for evaluation.

The network entity determines, at 714, whether one or more block error rate (BLER) criteria indicative of a sleeping cell are met. A BLER criterion may be met when the BLER for the cell increases. The gNB 114 may store BLERs for the cell over time as described with reference to FIG. 6B in relation to the number of connected user equipment. The network entity may receive data indicative of the BLERs. The network entity may evaluate the data and determine whether the BLER increased. For example, the network entity may determine that the criterion is met when the BLER increases by more than a specified percentage (such as 100%) in a period of time (such as two minutes). The change in BLER may be indicative that the cell entered a sleep state and ceased receiving or processing acknowledge/non-acknowledge (ACK/NACK) data from user equipment in the cell.

The network entity may determine that the criterion is met when the BLER of the cell is higher than the BLER of one or more other cells, such as neighboring cells, or when the BLER of the cell exceeds the BLER of the one or more other cells by more than a specified percentage (such as 40%). The discrepancy between the BLER of the cell and the BLER of a neighboring cell may be indicative that the cell entered the sleep state, whereas the neighboring cell did not.

The network entity determines, at 716, whether one or more supplemental downlink criteria indicative of a sleeping cell are met. Supplemental downlink for the user equipment 116 may be activated when a buffer status report (BSR) for the user equipment 116 indicates that additional resources are needed to meet the user equipment 116 downlink requirements. For example, the supplemental downlink may be activated when the BSR indicates that the user equipment 116 is to receive a relatively large amount of data in the downlink. The gNB 114 performs carrier aggregation (CA) to assign multiple frequency blocks to the user equipment 116 (for example, across multiple downlink carriers or multiple component carriers).

The network entity may determine that a supplemental downlink criterion is met when carrier aggregation is not activated in response to activation of the supplemental downlink. For example, the network entity or another network entity of the gNB 114 may store data indicating whether carrier aggregation has been activated and whether supplemental downlink for the user equipment 116 has been activated. The network entity may receive the data. If the network entity determines the supplemental downlink is activated but carrier aggregation is not activated, the network entity may determine that the supplemental downlink criterion is met. If the network entity determines that the supplemental downlink is activated and so is carrier aggregation, the network entity may determine that the supplemental downlink criterion is not met.

Referring back to FIG. 5, after the network entity determines, at 510, whether resource utilization criteria indicative of a sleeping cell are met, the network entity determines, at 512, whether network traffic criteria indicative of a sleeping cell are met. As described herein, determining whether the network event traffic criteria are met may include determining whether one or more interface data rate criteria indicative of a sleeping cell are met, determining whether one or more tunnel identity criteria indicative of a sleeping cell are met, determining whether one or more bearer criteria indicative of a sleeping cell are met, determining whether one or more software package criteria indicative of a sleeping cell are met, determining whether one or more configuration change criteria indicative of a sleeping cell are met, determining, based on user equipment logs, whether one or more criteria indicative of a sleeping cell are met or a combination thereof.

Figure 9:
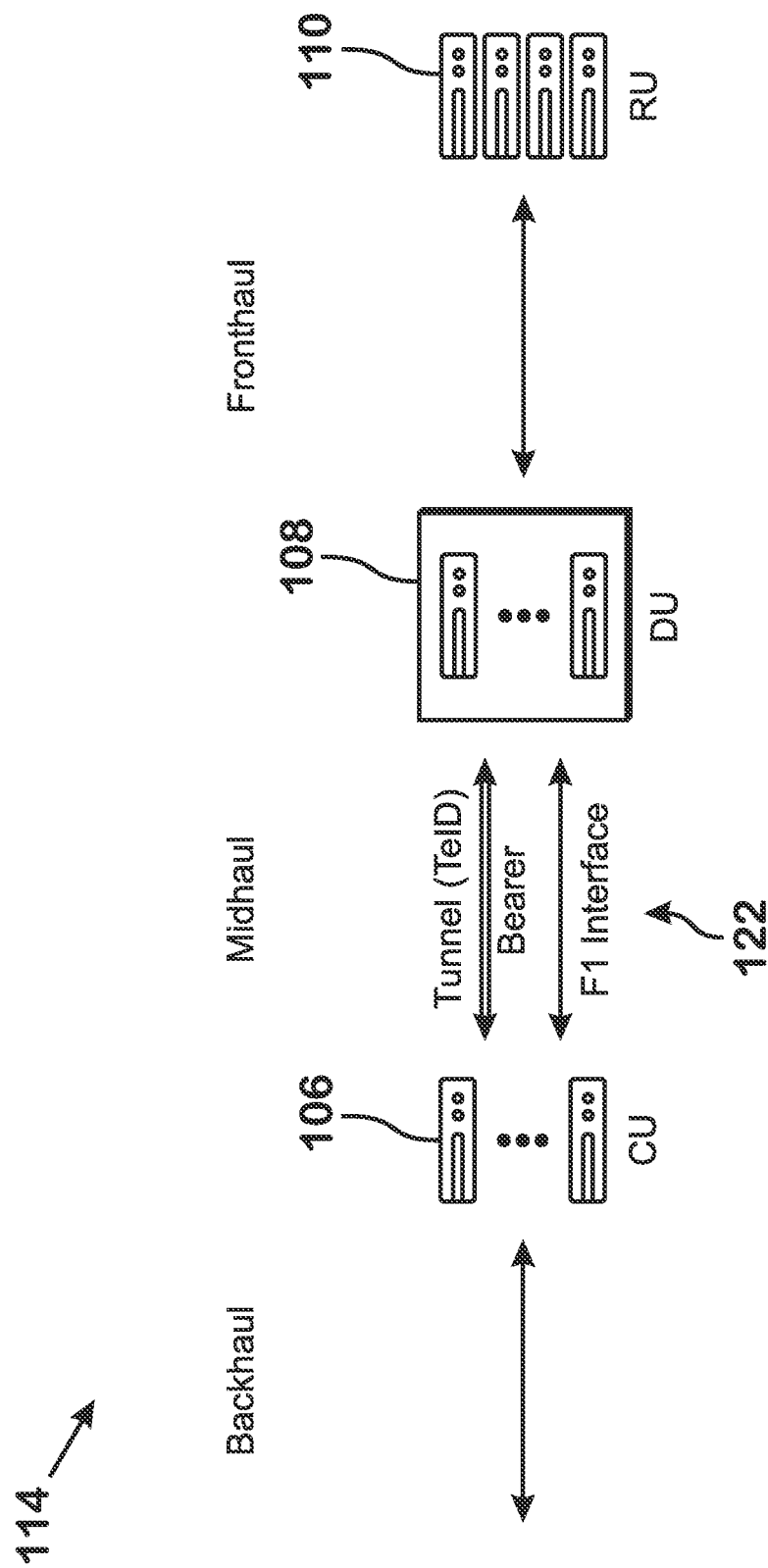
FIG. 9 shows an example of the connectivity of entities of the gNB described with reference to FIG. 1.

FIG. 9 shows an example of the connectivity of entities of the gNB 114 described with reference to FIG. 1. The radio unit 110 of the gNB 114 has a fronthaul interface with the distributed unit 108, and the distributed unit 108 has a midhaul interface with the central unit 106. The central unit 106 has a backhaul interface to other entities outside of the gNB 114. The midhaul interface includes an F1 interface 122 between the distributed unit 108 and the central unit 106. A bearer (or a carrier) is established over the F1 interface 122 for trafficking data between the distributed unit 108 and the central unit 106. The distributed unit 108 and the central unit 106 use a tunneling protocol for encapsulating data (which may include user data and control information or message) between the distributed unit 108 and the central unit 106. Each connection between the distributed unit 108 and the central unit 106 or each packet of encapsulated data is identified by a tunnel endpoint identifier (TeID). The tunnel endpoint identifier may uniquely identify each connection between the distributed unit 108 and the central unit 106, where the connection may include data of a user equipment. For example, the connection may exclusively include the data of the user equipment.

In a 5GCore, bidirectional flows may be established in the network 100. For example, a Quality of Service (QOS) flow having a QoS flow identifier (QFI) may be trafficked between network entities and the user equipment 116. A user plane function (UPF) of the network 100 may map downlink packets to QoS flows depending on packet data rules (PDRs). The flows may be tunneled (e.g., in an N3 tunnel) and mapped to data radio bearers (DRBs). Multiple QoS flows may be mapped to one DRB. One or more QoS flows, DRBs or QoS flow tunnels may be part of a packet data unit (PDU) session between the user equipment 116 and a data network. For example, the data network may be an internet server. The user equipment 116 may provide uplink packets, and a service data adaptation protocol of the user equipment 116 may map the uplink packets to QoS flows. Similar to the downlink, the network 100 maps the QoS flows of the user equipment 116 to the DRBs and tunnels the QoS flows as part of the PDU session.

Further, an Evolved Packet System (EPS) bearer may be established over the fronthaul interface or the midhaul interface. The EPS bearer may be established when a packet data network (PDN) connection with an internet access point name (APN) or an IP multimedia subsystem (IMS) APN is established with a user equipment. The EPS bearer may be used to traffic data using a session initiation protocol (SIP).

Determining whether the network traffic criteria indicative of the sleeping cell are met may include evaluating traffic over fronthaul interface or the midhaul interface and using the evaluation to determine whether the network traffic criteria is met.

Figure 10:
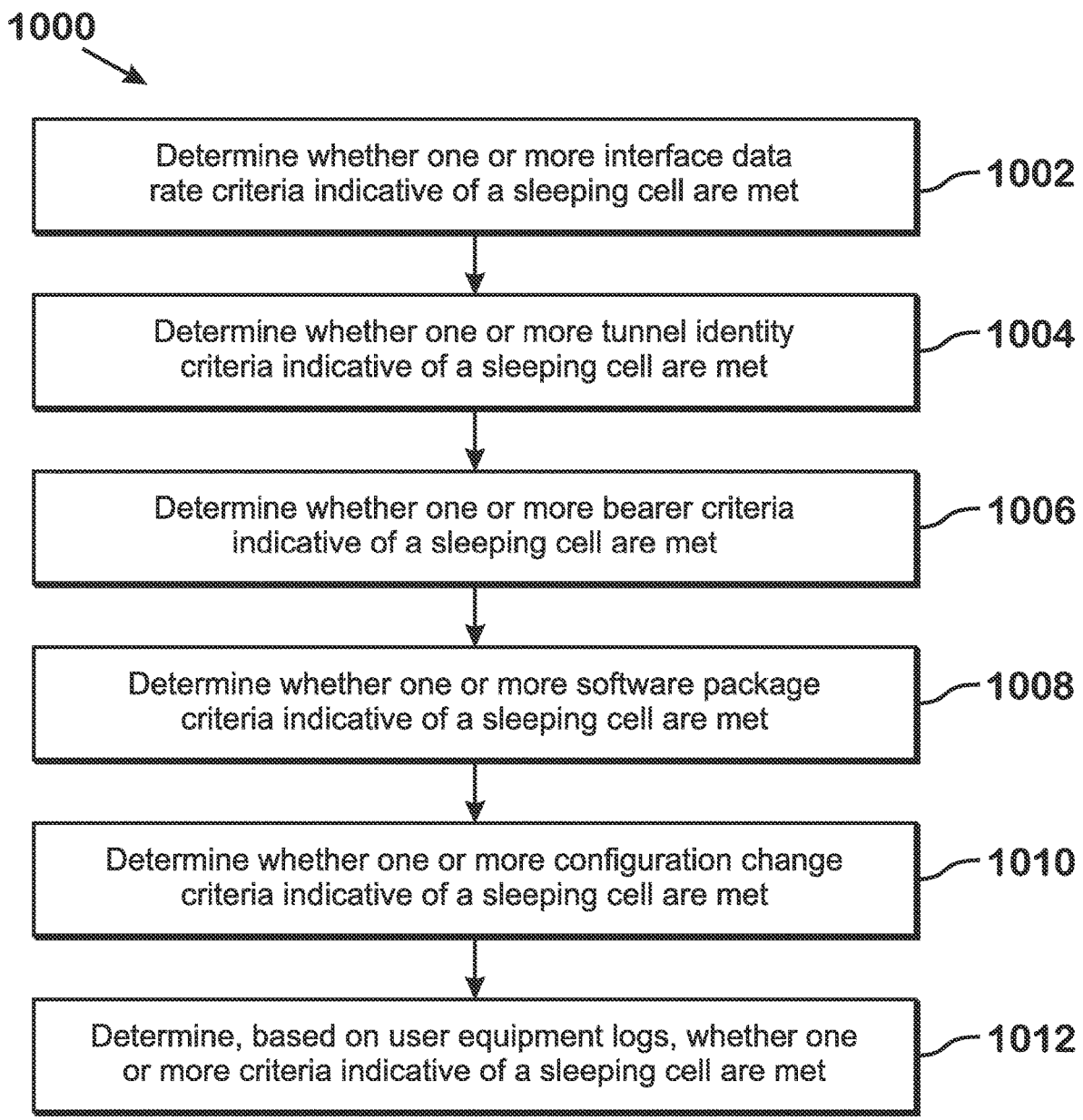
FIG. 10 shows a flow diagram of a method for determining whether the network traffic criteria indicative of a sleeping cell are met.

FIG. 10 shows a flow diagram of a method 1000 for determining whether the network traffic criteria indicative of a sleeping cell are met. In the method 1000, a network entity, determines, at 1002, whether one or more interface data rate criteria indicative of a sleeping cell are met. An interface data rate criterion may be met if the data rate of the F1 interface 122 for the cell is greater than a threshold. The data rate may be an amount of data (as measured in bits or Bytes, for example) that is trafficked between the central unit 106 and the distributed unit 108 in a unit of time (such as one second). The threshold may be the data rate for another cell, such as a neighboring cell. Further, the data rate of the other cell may be adjusted downward to account for variability within different cells. For example, the threshold may be half or 80% of the data rate of the other cell. The interface data rate may be stored by the network entity or another network entity. The network entity may retrieve the interface data rate to determine whether an interface data rate criterion is met. The evaluated data rate may be the data rate of any type of data, such as user data, control information (or control messages), IMS signaling, internet APN signalling or a combination thereof.

Alternatively or additionally, the network entity may determine whether a latency criterion is met. Latency negatively impacts the passage of data in the fronthaul or the midhaul and results in lower data rates over the fronthaul or the midhaul. The network entity may determine that the latency criterion is met when latency is lower than a threshold and vice-versa.

The network entity determines, at 1004, whether one or more tunnel identity criteria indicative of a sleeping cell are met. As described herein, encapsulated data pertaining to a user equipment is identified by a TeID. The network entity receives a number of TeIDs associated with a cell and tracks the number. For example, when the network entity observes that there is a greater amount of TeIDs associated with the cell over the midhaul interface, then it may be concluded that the cell is not in a sleep state. Further, variability in the number of TeIDs trafficked over the midhaul interface suggests that the cell is not in a sleep state. That is due to the fact that a healthy cell (e.g., a cell that is not in a sleep or blocked state) has a variable number of user equipment over time. During the course of operation, user equipment are connected and disconnected from the cell.

The network entity or another network entity may store the various TeIDs pertaining to user equipment connected in the cell, the number of TeIDs pertaining to user equipment connected in the cell or both. The network entity may receive the number of TeIDs pertaining to user equipment connected in the cell. The network entity may evaluate the number of TeIDs to determine whether a tunnel identity criterion is met. For example, if the number is below a threshold, the network entity may determine that the criterion is not met. If the number is greater than or equal to the threshold, the network entity may determine that the criterion is met. Similar to the midhaul data rate, the threshold may be the number of TeIDs for another cell, such as a neighboring cell. The number of TeIDs of the other cell may be adjusted downward (e.g., by discounting the number by half, a third or a fifth, among others) to account for variability within different cells.

The network entity may evaluate whether the number of TeIDs changes over time. If the number is static over time, the network entity may determine that the tunnel identity criterion is met. If the number changes over time, the network entity may determine that the criterion is not met. The number of TeIDs may be stored over time similar to the number of connected user equipment described with reference to FIG. 6B. If the network entity determines that at one time instance, the number of TeIDs in the cell is non-zero and at a subsequent time instance, the number of TeIDs in the cell becomes zero, then the network entity determines that the criterion indicative of a sleeping cell is met. The drop in the number of TeIDs may suggest that the cell went into a sleep state.

In response to determining that the number of TeIDs in the cell has stayed unchanged and constant for a duration of time covering multiple time stamps, the network entity determines that the criterion is met. Conversely, in response to determining that the number of TeIDs in the cell has changed in a duration of time covering multiple time stamps, the network entity determines that the criterion is not met.

The network entity determines, at 1006, whether one or more bearer criteria indicative of a sleeping cell are met. The network entity or another network entity may store the number of bearers established over the fronthaul or the midhaul for a cell. Additionally or alternatively, the network entity or another network entity may store identities of bearers established over the fronthaul or the midhaul for the cell. The number or identities of bearers may be stored in a similar manner as described herein in relation to the number or identities of TeIDs. The network entity may similarly evaluate the number or identities of bearers established over the fronthaul or the midhaul for the cell to determine whether a bearer criterion indicative of a sleeping cell is met.

Determining whether the one or more bearer criteria are met may be based on QoS flows, QFIs, DRBs, QoS flow tunnels (e.g., QoS flow N3 tunnels) and PDU sessions. The network entity or another network entity may store, for a cell, the number of QoS flows, QFIs, DRBs, QOS flow tunnels and PDU sessions or identifiers thereof. The number or identities may be stored in a similar manner as described herein in relation to the number or identities of TeIDs. The network entity may similarly evaluate the number or identities of the QoS flows, QFIs, DRBs, QOS flow tunnels and PDU sessions for the cell to determine whether the bearer criterion is met.

The network entity determines, at 1008, whether one or more software package criteria indicative of a sleeping cell are met. Determining whether the one or more software package criteria may include validating that the central unit 106 or the distributed unit 108 has a particular software package installed thereon. The software package may be an up-to-date software package or a software package that is compatible with software packages used by other entities of the system 100.

Figure 11:
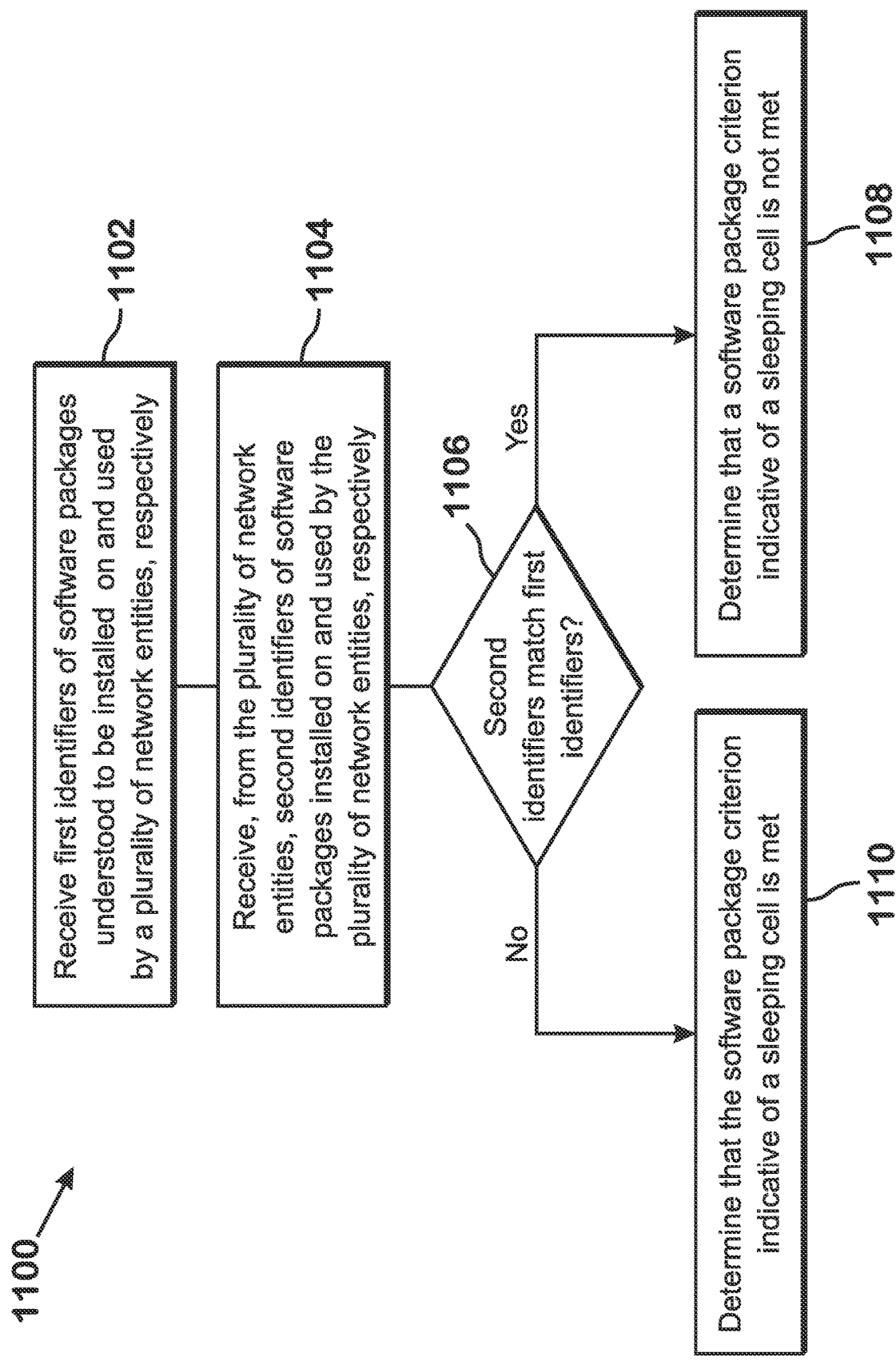
FIG. 11 shows a flow diagram of a method for determining whether one or more software package criteria indicative of a sleeping cell are met.

FIG. 11 shows a flow diagram of a method 1100 for determining whether one or more software package criteria indicative of a sleeping cell are met. The network entity, at 1102, receives first identifiers of software packages believed to be installed on and used by a plurality of network entities, respectively. The first identifiers of software packages may be stored by the network entity or another network entity. The first identifiers may be version numbers, among others. A software package may be a virtual operation system or application software for managing or controlling the communication operation of a network entity, among others. The first identifiers may represent identities of software packages believed (or assumed or understood) by the system to be installed on and used by the respective entities.

The network entity confirms whether the software packages are in fact installed and used by the respective network entities. At 1104, the network entity receives, from the plurality of network entities, second identifiers of software packages that are in fact installed on and used by the plurality of network entities, respectively. At 1106, the network entity determines whether the second identifiers match the first identifiers. In response to making a negative determination, the network entity determines that a software package criterion indicative of a sleeping cell is not met at 1108. That is due to the fact the entities have installed thereon and are using the particular software disseminated in the system and confirmed to be interoperable.

In response to making a positive determination, the network entity determines that the software package criterion indicative of the sleeping cell is met at 1110. The use by one or more entities of outdated software or different software may cause the cell to enter the sleep state. The software may not be compatible and may not interoperate with software used by other entities.

Referring back to FIG. 10, the network entity determines, at 1010, whether one or more configuration change criteria indicative of a sleeping cell are met. As described herein, the RAN intelligent controller 104 may change a configuration of gNB 114 entities, such as the central unit 106 or the distributed unit 108. The RAN intelligent controller 104 may change the configuration to optimize the network 100, perform load balancing, mitigate network congestion or deploy new services, among others. A configuration may be a transmit power used in a cell for uplink or downlink, a periodicity of synchronization signals transmitted in the system, an allocation of resources for uplink control information, an allocation of resources for downlink control information or a combination thereof.

An entry of a cell in a sleep state may be triggered by a configuration change. For example, lowering the transmit power or reducing the periodicity of synchronization signals trafficked between the gNB 114 and the user equipment 116 may cause the cell to enter a sleep state due to the fact that the transmit power or periodicity do not support reliable communication between the user equipment 116 and the gNB 114.

The gNB 114 or the RAN intelligent controller 104 may store configuration change history. The configuration change history may be a list (or table) of configuration changes (or identifiers thereof) made in the system 100. The list may include a time when the configuration change was sent to a system 100 entity or a time when the configuration change took effect. For each configuration change in the configuration change history, the list may include identifiers of one or more configurations that have been changed (for example, transmit power or resource allocation) and the changed parameters or settings of the configuration (for example, the value of the reduction or increase made to the transmit power). The list may also include a current configuration in use in the system 100. The current configuration may be an aggregate of the configuration changes that have been made.

The network entity may evaluate the configuration changes made in the system. The network entity may determine whether the configuration changes in the system caused a configuration (or system parameter) to depart from a specified value or range of values (e.g., a 'golden parameter'). The specified value or range of values may be an acceptable configuration setting. The network entity may determine that a configuration change criterion is met in response to determining that the configuration changes in the system caused a configuration to depart from the specified value or range of values of the 'golden parameter'. For example, the network entity may determine that a configuration change criterion is met if the configuration changes caused the transmit power to become less than a minimum transmit power or the periodicity of the synchronization signals to become less than a minimum periodicity. Conversely, the network entity may determine that the configuration change criterion is not met if, after the configuration changes take effect, the configuration does not depart from the specified value or range of values of the 'golden parameter'.

The network entity may receive the list (or table) of configuration changes from the gNB 114 or the RAN intelligent controller 104. The network entity may aggregate the configuration changes to determine a current configuration that is at the time being actively used in the cell. Alternatively, the network entity may receive a current configuration that is an aggregate of the configuration changes that have been made.

At 1012, the network entity determines, based on user equipment logs, whether one or more criteria indicative of a sleeping cell are met. The user equipment 116, which may be a smartphone or a tablet, among others, may log events and report the logged events to the gNB 114. An event may be a connection request that the user equipment 116 makes through a cell or a connection establishment failure in the cell in response to the connection request, among others. The user equipment 116 may report the events through RRC signaling. Further, the user equipment 116 may execute an application (for example, of a service provider or an operator) that is installed on the user equipment 116. For example, user equipment that belong to a subscriber of a service provider or an operator. The subscriber may install the application of the service provider or the operator on the user equipment.

The user equipment 116 may report the events through the application. The user equipment 116 may report the events over the internet to a server of the service provider or operator. The network entity may receive the events log from the server. The network entity may aggregate for a cell the number of connection requests made by user equipment in the cell and the number of connection establishment failures in response to connection requests in the cell. The network entity may determine a ratio of the number of connection establishment failures in the cell to the number of connection requests made by user equipment. The ratio may be represent a failure rate of connection requests in the cell. The network entity may determine that a criterion indicative of a sleeping cell is met if the failure rate is greater than a threshold (such as 10% or 20%). The network entity may determine that the criterion is not met if the failure rate is less than the threshold. The network entity may determine that a criterion indicative of a sleeping cell is met if the failure rate is greater than the failure rate another cell, such as a neighboring cell, and the network entity may determine that the criterion is not met if the failure rate is less than the failure rate of the other cell.

Referring back to FIG. 5, after the network entity determines, at 512, whether network traffic criteria indicative of a sleeping cell are met, the network entity weighs, at 514, one or more of the connection state criteria described with reference to FIG. 6A herein, the resource utilization criteria described with reference to FIG. 7 herein, the network traffic criteria described with reference to FIG. 10 herein or a combination thereof.

Weighing the one or more criteria may include selecting the one or more criteria of the connection state criteria, the resource utilization criteria, the network traffic criteria or a combination thereof. The weighing includes applying one or more weighting factors (or weights) to the one or more selected criteria, respectively. The weighting factors of respective criteria may be equal or non-equal. For example, when a criterion is met, the criterion may be designated as a "1" and when the criterion is not met, the criterion may be designated as a "0." The network entity may multiply the weighting factor of a criterion by "0" or "1" depending on whether the criterion is met or not met. Thus, when the criterion is met, the weighing factor fully contributes to sleeping cell determination. The network entity may sum the respective products of the different criteria to produce a sum. The network entity may compare the sum to a threshold to determine whether the cell is to be designated as sleeping.

For example, the weighting factors may be normalized such that each weighting factor may be greater than zero and less than or equal to one and the sum of the weighting factors may be one. A weighting factor of zero may indicate that the criterion does not factor in sleeping cell determination. When the weighting factors are normalized, the threshold may be set to any number between 0 and 1. The network entity may determine that the cell is in a sleep state when the sum of the weighting factor products is greater than a threshold of 0.4, 0.5 or 0.6, for example.

A weighting factor may represent a contribution of a criterion to sleep cell determination. The network entity may only determine whether a criterion is met when the criterion is associated with a weighing factor that is non-zero. Accordingly, computational resources are preserved and a criterion that does not contribute to sleeping cell determination is not evaluated.

The network entity may evaluate a combination of one or more connection state criteria, one or more network traffic criteria and one or more connection state criteria. Alternatively, the network entity may exclusively evaluate one or more connection state criteria, exclusively evaluate one or more network traffic criteria or exclusively evaluate one or more connection state criteria. The network entity may base sleep state determination on one or more criteria belonging to one criterion category or multiple criterion categories.

Weighing may also be non-linear, and a weight associated with a criterion may change depending on whether another criterion is met or not met. For example, if the channel measurement criterion (evaluated at 604) is not met, then that is indicative of relatively poor channel conditions in which RACH requests are more likely to fail. Accordingly, the RACH criterion indicative of a sleeping cell (evaluated at 602) is more likely to be satisfied and may be attributed to poor channel conditions (rather than a cell sleep state). Thus, when the channel measurement criterion is not met, the weighting factor of the RACH criterion may be reduced (as compared to the case when the channel measurement criterion is met). Reducing the weighting factor aids in ensuring that poor channel quality does not over-contribute to sleep state determination.

The network entity determines, at 516, whether the cell is in a sleep state based on weighing the one or more criteria. If the network entity determines that the cell is in a sleep state, the network entity recovers the cell from the sleep state at 518. The network entity may send an instruction to the gNB 114 to perform a software restart on the cell (or "reboot" the cell). The gNB 114 may shut down the cell and dynamically start the cell anew. The network entity may also raise an alarm or send a message to the gNB 114 indicating that the cell is asleep.

Based on determining that the cell is in a sleep state, the network entity may generally take an action to cause the cell to exit the sleep state. The action may include outputting a command alerting the gNB 114 that the cell is in a sleep state. The command may include an identifier of the cell. The action may include causing the cell to be rebooted.

Figure 12:
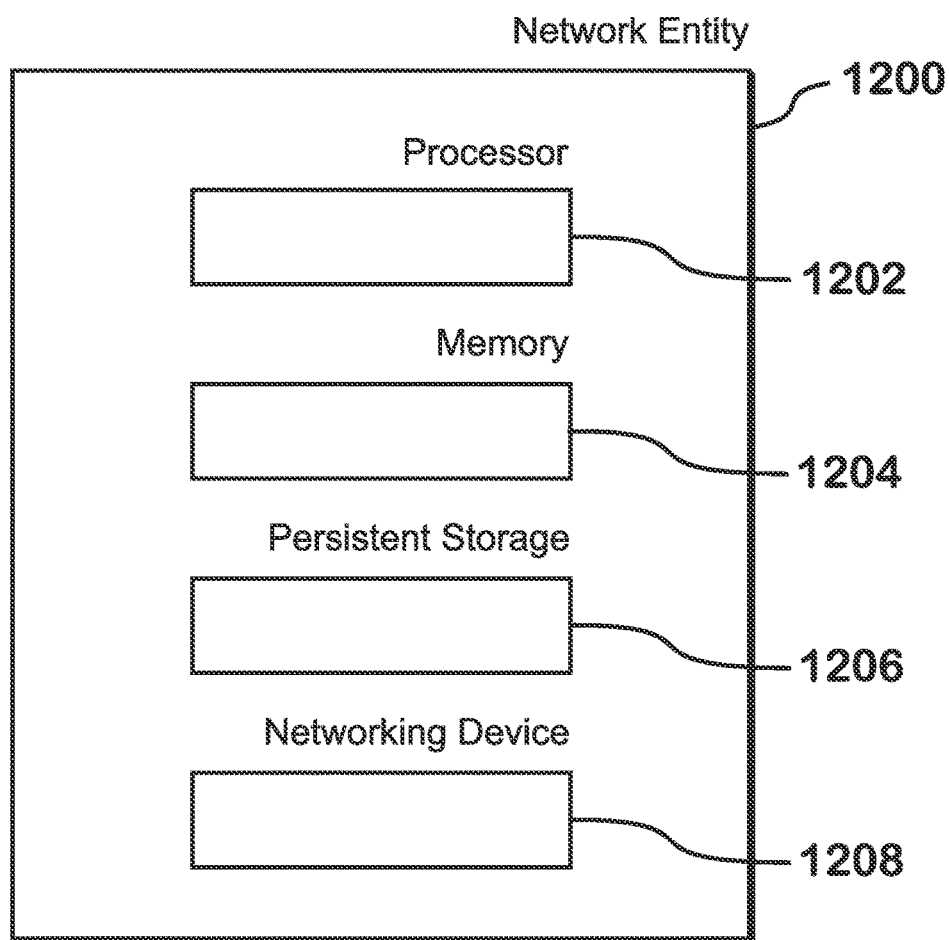
FIG. 12 shows a block diagram of a network entity.

FIG. 12 shows a block diagram of a network entity 1200. The network entity 1200 may be one or more server computer systems, cloud computing platforms, virtual machines or a combination thereof. The network entity 1200 includes a processor 1202, memory 1204, persistent storage 1206 and network device 1208. The network entity 1200 may also include other components (not shown). As described herein, the network entity 1200 may be an element management system 105, the RAN intelligent controller 104, the central unit 104 or a combination thereof.

The processor 1202 may be a controller, microcontroller or microprocessor, and may include a central processing unit ("CPU") or an arithmetic and logic unit (ALU) for executing computer programs or executable instructions. The network entity 1200 uses the processor 1202 to determine whether one or more criteria indicative of a sleeping cell described herein are met and use the determination of whether the one or more criteria are met to determine whether the cell is in a sleep state and recover the cell. The memory 1204 stores executable instruction and data. The processor 1202 executes the executable instructions, which causes the processor 1202 to perform the technique described herein including determining whether one or more sleep state criteria are met and whether the cell is in a sleep state. The memory 1204 may also store an operating system including a kernel and device drivers. The memory 1204 may also data used to evaluate a criterion. For example, the memory 1204 may store a channel measurement report, such as CQI, SNR, SINR, SNDR, RSSI or RSRP, data representative of tracking cell-to-neighboring cell handover attempts, data representative of neighboring cell-to-cell connection reestablishment, data indicative of a number of user equipment that have an RRC connection in various cells and various timestamps, among others, as described herein.

The persistent storage device 1206 may be a virtual drive, a hard drive or a flash drive, among others. The persistent storage device 1206 persistently stores programs and data. The networking device 1208 enables the network entity 1200 to communicate with other devices, such as the gNB 114. The networking device 1208 may be a modem, antenna, radio transmitter, receiver or transceiver, optical transmitter, receiver or transceiver or wireless or wired port, among others. Further, the network entity 1200 may include networking hardware, such as switches, routers or repeaters, among others. The network entity 1200 may output data over the networking device 1208 to other devices in the network and receive data from the other devices in the network over the networking device 1208.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An Open Radio Access Network (O-RAN) network entity, comprising:
 a processor; and
 memory, coupled to the processor, having stored thereon executable instructions that, when executed by the processor, cause the processor to:
  receive one or more connection state criteria indicative of whether a cell is in a sleep state to determine whether the one or more connection state criteria are met, wherein the one or more connection state criteria include a random access channel (RACH) criterion;
  evaluate the one or more connection state criteria to determine whether the one or more connection state criteria are met, including:
   determine whether the RACH criterion is met, including:
    count a number of RACH requests made in the cell;

determine whether the number of RACH requests exceeds a threshold; and in response to determining that the number of RACH requests exceeds the threshold, determine that the RACH criterion is met, in response to determining that the RACH criterion is met, determine that the one or more connection state criteria are met;

determine that the cell is in the sleep state based on the one or more connection state criteria being met; and in response to determining that the cell is in the sleep state, cause the cell to exit the sleep state.

2. The O-RAN network entity of claim 1, wherein the threshold is set based on a historical average of the number of RACH requests in the cell or an average number of RACH requests in a neighboring cell.

3. The O-RAN network entity of claim 1, wherein:

the one or more connection state criteria include a channel measurement criterion, and the executable instructions cause the processor to evaluate the one or more connection state criteria to determine whether the one or more connection state criteria are met, including:

determine whether the channel measurement criterion is met, including:

receive a channel measurement made in the cell, wherein the channel measurement is a channel quality indicator (CQI), signal-to-noise ratio (SNR), signal-to-interference plus noise ratio (SINR), signal-to-noise plus distortion ratio (SNDR), received signal strength indicator (RSSI) or reference signal received power (RSRP);

determine whether the channel measurement exceeds a threshold; and in response to determining that the channel measurement exceeds the threshold, determine that the channel measurement criterion is met; and in response to determining that the channel measurement criterion is met, determine that the one or more connection state criteria are met.

4. The O-RAN network entity of claim 3, wherein the channel measurement is made by a user equipment or a next generation NodeB (gNB) that communicates in the cell.

5. The O-RAN network entity of claim 1, wherein:

the one or more connection state criteria include a cell handover criterion, and the executable instructions cause the processor to evaluate the one or more connection state criteria to determine whether the one or more connection state criteria are met, including:

determine whether the cell handover criterion is met, including:

track user equipment handover attempts from a neighboring cell to the cell;

track user equipment connection reestablishment in the neighboring cell;

determine a proportion of user equipment that attempted a handover to the cell and later reestablished a connection in the neighboring cell; and determine whether the cell handover criterion is met based on the proportion of user equipment; and in response to determining that the cell handover criterion is met, determine that the one or more connection state criteria are met.

6. The O-RAN network entity of claim 1, wherein the executable instructions cause the processor to:

before evaluating the one or more connection state criteria, determining the cell is in service by at least:

determining that the cell is not associated with an alarm;

determining that the cell is not in a barred state; and determining that an impedance mismatch in a connection between a radio frequency unit and a radio unit of a next generation NodeB (gNB) of the cell is less than a threshold.

7. A method, comprising:

receiving one or more connection state criteria indicative of whether a cell is in a sleep state to determine whether the one or more connection state criteria are met, wherein the one or more connection state criteria include a channel measurement criterion;

evaluating the one or more connection state criteria to determine whether the one or more connection state criteria are met, including:

determining whether the channel measurement criterion is met, including:

receiving a channel measurement made in the cell, wherein the channel measurement is a channel quality indicator (CQI), signal-to-noise ratio (SNR), signal-to-interference plus noise ratio (SINR), signal-to-noise plus distortion ratio (SNDR), received signal strength indicator (RSSI) or reference signal received power (RSRP);

determining whether the channel measurement exceeds a threshold; and in response to determining that the channel measurement exceeds the threshold, determining that the channel measurement criterion is met, in response to determining that the channel measurement criterion is met, determine that the one or more connection state criteria are met, determining that the cell is in the sleep state based on the one or more connection state criteria being met; and in response to determining that the cell is in the sleep state, causing the cell to exit the sleep state.

8. The method of claim 7, wherein:

the one or more connection state criteria include a random access channel (RACH) criterion, and wherein evaluating the one or more connection state criteria to determine whether the one or more connection state criteria are met includes:

determining whether the RACH criterion is met, including:

counting a number of RACH requests made in the cell;

determining whether the number of RACH requests exceeds a threshold; and in response to determining that the number of RACH requests exceeds the threshold, determining that the RACH criterion is met; and in response to determining that the RACH criterion is met, determining that the one or more connection state criteria are met.

9. The method of claim 8, wherein the threshold is set based on a historical average of the number of RACH requests in the cell or an average number of RACH requests in a neighboring cell.

10. The method of claim 7, wherein the channel measurement is made by a user equipment or a next generation NodeB (gNB) that communicates in the cell.

11. The method of claim 7, wherein:

the one or more connection state criteria include a cell handover criterion, and wherein evaluating the one or more connection state criteria to determine whether the one or more connection state criteria are met includes:
determining whether the cell handover criterion is met, including:
tracking user equipment handover attempts from a neighboring cell to the cell;
tracking user equipment connection reestablishment in the neighboring cell;
determining a proportion of user equipment that attempted a handover to the cell and later reestablished a connection in the neighboring cell; and
determining whether the cell handover criterion is met based on the proportion of user equipment; and
in response to determining that the cell handover criterion is met, determining that the one or more connection state criteria are met.

12. The method of claim 7, comprising:
before evaluating the one or more connection state criteria, determining the cell is in service by at least:
determining that the cell is not associated with an alarm;
determining that the cell is not in a barred state; and
determining that an impedance mismatch in a connection between a radio frequency unit and a radio unit of a next generation NodeB (gNB) of the cell is less than a threshold.

13. An Open Radio Access Network (O-RAN) network entity, comprising:
a processor configured to:
receive one or more connection state criteria indicative of a cell that is in a sleep state to determine whether the one or more connection state criteria are met, wherein the one or more connection state criteria include a cell handover criterion;
evaluate the one or more connection state criteria to determine whether the one or more connection state criteria are met, including:
determine whether the cell handover criterion is met, including:
track user equipment handover attempts from a neighboring cell to the cell;
track user equipment connection reestablishment in the neighboring cell;
determine a proportion of user equipment that attempted a handover to the cell and later reestablished a connection in the neighboring cell; and
determine whether the cell handover criterion is met based on the proportion of user equipment,
in response to determining that the cell handover criterion is met, determine that the one or more connection state criteria are met determine that the cell is in the sleep state based on the one or more connection state criteria are met; and
a networking device configured to, in response to determining that the cell is in the sleep state, output a command to cause the cell to exit the sleep state.

14. The O-RAN network entity of claim 13, wherein:
the one or more connection state criteria include a random access channel (RACH) criterion, and
the processor is configured to evaluate the one or more connection state criteria to determine whether the one or more connection state criteria are met, including:
determine whether the RACH criterion is met, including:
count a number of RACH requests made in the cell;
determine whether the number of RACH requests exceeds a threshold; and
in response to determining that the number of RACH requests exceeds the threshold, determine that the RACH criterion is met; and
in response to determining that the RACH criterion is met, determine that the one or more connection state criteria are met.

15. The O-RAN network entity of claim 14, wherein the threshold is set based on a historical average of the number of RACH requests in the cell or an average number of RACH requests in a neighboring cell.

16. The O-RAN network entity of claim 13, wherein:
the one or more connection state criteria include a channel measurement criterion, and
the processor is configured to evaluate the one or more connection state criteria to determine whether the one or more connection state criteria are met, including:
determine whether the channel measurement criterion is met, including:
receive a channel measurement made in the cell, wherein the channel measurement is a channel quality indicator (CQI), signal-to-noise ratio (SNR), signal-to-interference plus noise ratio (SINR), signal-to-noise plus distortion ratio (SNDR), received signal strength indicator (RSSI) or reference signal received power (RSRP);
determine whether the channel measurement exceeds a threshold; and
in response to determining that the channel measurement exceeds the threshold, determine that the channel measurement criterion is met; and
in response to determining that the channel measurement criterion is met, determine that the one or more connection state criteria are met.

17. The O-RAN network entity of claim 16, wherein the channel measurement is made by a user equipment or a next generation NodeB (gNB) that communicates in the cell.

* * * * *